United States Patent [19]

Mansfield et al.

[11] Patent Number: 5,014,192
[45] Date of Patent: May 7, 1991

[54] SYSTEM FOR LOCATING A FILE IN A LOGICAL RING BY SEQUENTIALLY FORWARDING ACCESS REQUEST WITH FILE SYSTEM NAME AND FILE NAME

[75] Inventors: Bruce M. Mansfield, Kent, Wash.; Frank C. Kolnick; Andrew I. Kun, both of Willowdale, Canada

[73] Assignee: Motorola Computer X, Inc., Kent, Wash.

[21] Appl. No.: 300,687

[22] Filed: Jan. 19, 1989

Related U.S. Application Data

[63] Continuation of Ser. No. 110,614, Oct. 19, 1987, abandoned, which is a continuation of Ser. No. 730,929, May 6, 1985, abandoned.

[51] Int. Cl.$^5$ .............................................. G06I 13/42
[52] U.S. Cl. ................... 364/200; 364/240.8; 364/241.1; 364/222.81; 364/284.4; 340/825.05; 370/85.5
[58] Field of Search ... 364/200 MS File, 900 MS File; 340/825.05, 825.50; 370/85.4, 85.5, 94.1

[56] References Cited

U.S. PATENT DOCUMENTS

| | | | |
|---|---|---|---|
| 4,366,479 | 12/1982 | Mori et al. | 340/825.05 |
| 4,477,881 | 10/1984 | Kobayashi et al. | 364/900 |
| 4,510,492 | 4/1985 | Mori et al. | 340/825.05 |
| 4,543,630 | 9/1985 | Neches | 364/200 |
| 4,590,468 | 5/1986 | Stieglitz | 364/200 X |
| 4,612,541 | 9/1986 | Ohnishi | 340/825.05 |
| 4,644,468 | 2/1987 | Doster et al. | 364/200 |
| 4,644,470 | 2/1987 | Feigenbaum et al. | 364/200 |
| 4,649,535 | 3/1987 | Ulug | 370/89 X |
| 4,682,326 | 7/1987 | Ulug | 370/89 |
| 4,698,629 | 10/1987 | Mori et al. | 340/825.05 |

OTHER PUBLICATIONS

Ebrahimi et al. "File Name Mapping Method Permitting Network Location Transparency", IBM TDB vol. 26, No. 7B, Dec. 1983, pp. 3791–3794.
IEE Proceedings, vol. 131, No. 2 Part E, Section A–I, Mar. 1984, pp. 38–44, Old Woking, Surrey, G.B., R. Hull et al., "Virtual Resource Ring".
The 1st Int'l Conf. on Computer Communication, Washington, 24th–26th Oct. 1972, pp. 364–370, A.C.M., N.Y., D. J. Farber et al., "The Structure of a Distributed Computer System".

*Primary Examiner*—Thomas C. Lee
*Attorney, Agent, or Firm*—Walter W. Nielsen

[57] ABSTRACT

A data management system used by a digital computer system comprises a plurality of individual file systems which are connected together in a logical ring configuration around which file requests travel. File requests may be transmitted by the user to the "next" file system in the ring relative to the user.

File requests optionally may or may not specify a file system name. If a file system name is specified, then the request is forwarded unidirectionally around the logical ring until either that file system name is found or the request returns to its starting point. If no file system name is specified, then an attempt is made to satisfy the request on each file system in turn until either the request is satisfied or the request returns to its starting point.

8 Claims, 6 Drawing Sheets

SYSTEM FOR LOCATING A FILE IN A LOGICAL RING BY SEQUENTIALLY FORWARDING ACCESS REQUEST WITH FILE SYSTEM NAME AND FILE NAME

RELATED INVENTIONS

This application is a continuation of prior application Ser. No. 110,614, filed Oct. 19, 1987, now abandoned which is a continuation of Ser. No. 730,929, filed May 6, 1985, now abandoned.

The present invention is related to the following inventions, filed on even date herewith, all assigned to the assignee of the present invention:

1. Title: Nested Contexts in a Virtual Single Machine; Inventors: Andrew Kun, Frank Kolnich and Bruce Mansfield Ser. No.: 730,903 (now abandoned) and Ser. No. 270,437, filed 11/07/88, now abandoned.
2. Title: Network Interface Module With Minimized Data Paths; Inventors: Bernard Weisshaar and Michael Barnea; Ser. No.: 730,621, now U.S. Pat. No. 4,754,395.
3. Title: Method of Inter-Process Communication in a Distributed Data Processing System; Inventors: Bernard Weisshaar, Frank Kolnick, Andrew Kun, and Bruce Mansfield; Ser. No.: 730,892, now U.S. Pat. No. 4,694,396.
4. Title: Logical Ring in a Virtual Single Machine; Inventors: Andrew Kun, Frank Kolnick and Bruce Mansfield; Ser. No.: 730,923 (now abandoned) and Ser. No. 183,469, filed 4/15/88 (continuation).
5. Title: Virtual Single Machine With Message-Like Hardware Interrupts and Processor Exceptions; Inventor: Andrew Kun; Ser. No.: 730,922.

TECHNICAL FIELD

This invention relates generally to digital data processing, and, in particular, to a data management system comprising a plurality of file systems coupled in a logical ring.

BACKGROUND OF THE INVENTION

The present invention concerns a distributed data processing system—that is, two or more data processing systems which are capable of functioning independently but which are so coupled as to send and receive messages to and from one another.

A Local Area Network (LAN) is an example of a distributed data processing system. A typical LAN comprises a number of autonomous data processing "cells", each comprising at least a processor and memory. Each cell is capable of conducting data processing operations independently. In addition, each cell is coupled (by appropriate means such as a twisted wire pair, coaxial cable, fiber optic cable, etc.) to a network of other cells which may be, for example, a loop, star, tree, etc., depending upon the design considerations.

As mentioned above, the present invention finds utility in such a distributed data processing system, since there is a need in such a system for the processes which are executing or to be executed in the individual cells to share data and to communicate data among themselves.

Information may be thought of as being stored in the form of files in one or more "file systems". A file system is a way of logically organizing data, and it may comprise one or more physical data storage devices. Usually, a file system comprises an organized arrangement of data and a file index identifying the data, its location, and perhaps other characteristics.

In the present invention, any of the individual cells of a LAN may contain one or more file systems. Certain file systems may be unique, while other file systems may be copies in order to provide a degree of redundancy.

There is an urgent need in certain distributed data processing systems to provide "data access transparency". Data access transparency is defined herein to mean that any file can be accessed by any process located anywhere in the distributed data processing system.

There is also an urgent need regarding certain of such distributed data processing systems to provide "data residence transparency". Data residence transparency is defined herein to mean that any file can be accessed wherever it may reside, even if it has been physically moved within the system.

BRIEF SUMMARY OF INVENTION

Accordingly, it is an object of the present invention to provide an improved data management system within a distributed data processing system.

It is also an object of the present invention to provide a distributed data processing system having a data management system with data access transparency.

It is a further object of the present invention to provide a distributed data processing system having a data management system with data residence transparency.

These and other objects are achieved in accordance with a preferred embodiment of the invention by providing a data management system for use in a data processing system, the data management system comprising a plurality of individual file systems, means for coupling the file systems together, means for generating an access request to one of the file systems, and means for attempting to satisfy the access request by accessing successive file systems until either the access request is satisfied or until all of the file systems have been accessed.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

OVERVIEW OF COMPUTER SYSTEM

Figure 1:
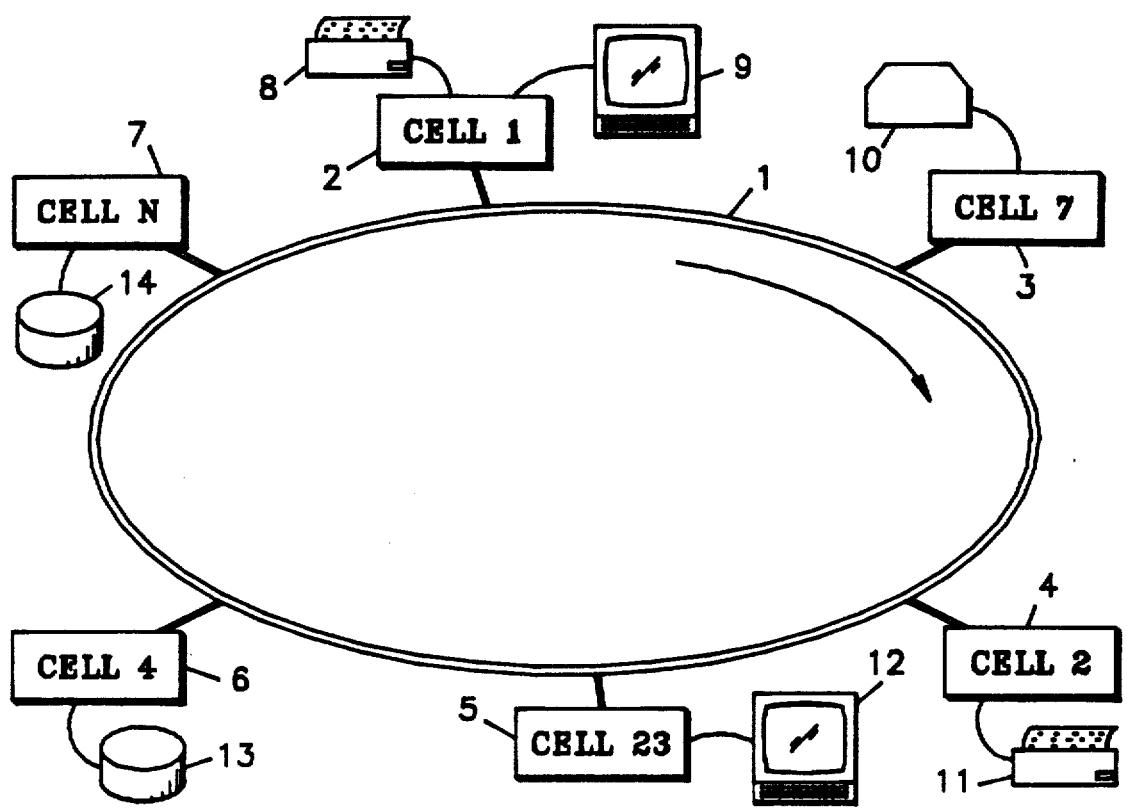
FIG. 1 shows a representational illustration of a single network, distributed data processing system incorporating the improved data management system of the present invention.

With reference to FIG. 1, a distributed computer configuration is shown comprising multiple cells 2-7 (nodes) loosely coupled by a local area network (LAN) 1. The number of cells which may be connected to the network is arbitrary and depends upon the user application. Each cell comprises at least a processor and memory, as will be discussed in greater detail with reference to FIG. 2 below. In addition, each cell may also include other units, such as a printer 8, operator display module (ODM) 9, mass memory module 13, and other I/O device 10.

Figure 2:
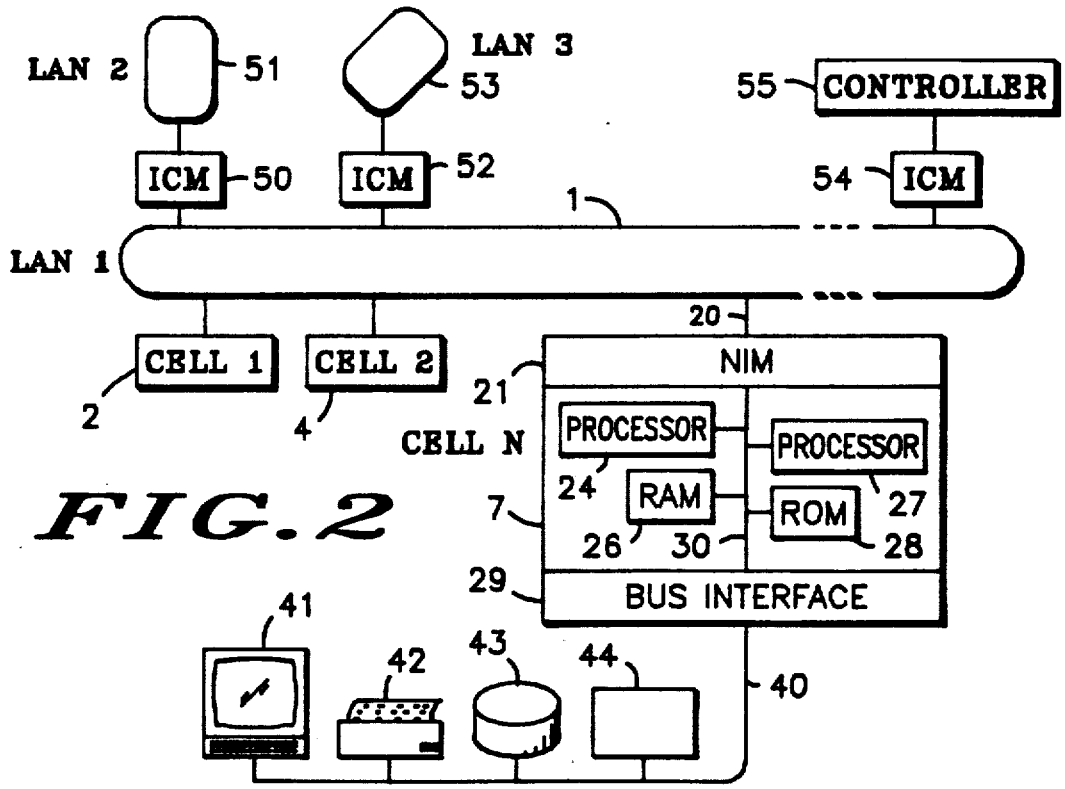
FIG. 2 shows a block diagram illustrating a multiple-network, distributed data processing system incorporating the improved data management system of the present invention.

With reference now to FIG. 2, a multiple-network distributed computer configuration is shown. A first local area network LAN 1 comprises several cells 2, 4, and 7. LAN 1 is coupled to a second local area network LAN 2 by means of an Intelligent Communications Module (ICM) 50. The Intelligent Communications Module provides a link between the LAN and other networks and/or remote processors (such as programmable controllers).

LAN 2 may comprise several cells (not shown) and may operate under the same LAN protocol as that of the present invention, or it may operate under any of several commercially available protocols, such as Ethernet; MAP, the Manufacturing Automation Protocol of General Motors Corp.; Systems Network Architecture (SNA) of International Business Machines, Inc.; SECS-II; etc. Each ICM 50 is programmable for carrying out one of the above-mentioned specific protocols. In addition, the basic processing module of the cell itself can be used as an intelligent peripheral controller (IPC) for specialized devices.

LAN 1 is additionally coupled to a third local area network LAN 3 via ICM 52. A process controller 55 is also coupled to LAN 1 via ICM 54.

A representative cell N (7, FIG. 2) comprises a processor 24 which, in a preferred embodiment, is a Motorola 68010 processor. Each cell further includes a read only memory (ROM) 28 and a random access memory (RAM) 26. In addition, each cell includes a Network Interface Module (NIM) 21, which connects the cell to the LAN, and a Bus Interface 29, which couples the cell to additional devices within a cell. While a minimal cell is capable of supporting two peripheral devices, such as an Operator Display Module (ODM) 41 and an I/O Module 44, additional devices (including additional processors, such as processor 27) can be provided within a cell. Other additional devices may comprise, for example, a printer 42, and a mass-storage module 43 which supports a hard disk and a back-up device (floppy disk or streaming tape drive).

The Operator Display Module 41 provides a keyboard and screen to enable an operator to input information and receive visual information.

While a single cell may comprise all of the above units, in the typical user application individual cells will normally be dedicated to specialized functions. For example, one or more mass storage cells may be set up to function as data base servers. There may also be several operator consoles and at least one cell for generating hard-copy printed output. Either these same cells, or separate dedicated cells, may execute particular application programs.

The system is particularly designed to provide an integrated solution for factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debugger, and performance-monitoring tools.

Local Area Network

The local area network, as depicted in either FIG. 1 or FIG. 2, ties the entire system together and makes possible the distributed virtual machine model described below. The LAN provides high throughput, guaranteed response, reliability, and low entry cost. The LAN is also autonomous, in the sense that all system and applications software is unaware of its existence. For example, any Network Interface Module (e.g. NIM 21, FIG. 2) could be replaced without rewriting any software other than that which directly drives it.

The LAN interconnection medium may be twisted-pair or coaxial cable. Two channels (logically, two distinct networks) may be provided for reliability and for increased throughput.

The LAN architecture is a logical ring, in which an electronic "token" is constantly passed from cell to cell at high speed. The current holder of the token may use it to send a "frame" of data or may pass it on to the next cell in the ring. The NIM only needs to know the logical address and status of its immediately succeeding neighbor. The NIM's responsibility is limited to detecting the failure of that neighbor or the inclusion of a new neighbor. In general, adjustment to failed or newly added cells is automatic.

The network interface maps directly into the processor's memory. Data exchange occurs through a dual-ported buffer pool which contains a linked list of pending "frames". Logical messages, which vary in length, are broken into fixed-size frames for transmission and are re-assembled by the receiving NIM. Frames are sequence-numbered for this purpose. If a frame is not acknowledged within a short period of time, it is retransmitted a number of times before being treated as a failure.

As described above with reference to FIG. 2, the LAN may be connected to other LAN's operating under the same LAN protocol via so-called "bridgeways", or it may be connected to other types of LAN's via "gateways".

Software Model

The computer operating system of the present invention operates upon processes, messages, and contexts, as such terms are defined hereinafter in the section entitled "Virtual Machine". This operating system offers the programmer a hardware abstraction, rather than a data or control abstraction.

Processes are referenced without regard to their physical location via a small set of message-passing primitives. Every process has both a unique system-generated identifier and a not necessarily unique name assigned by the programmer. The identifier provides quick direct access, while the name has a limited scope and provides symbolic, indirect access.

Figure 3:
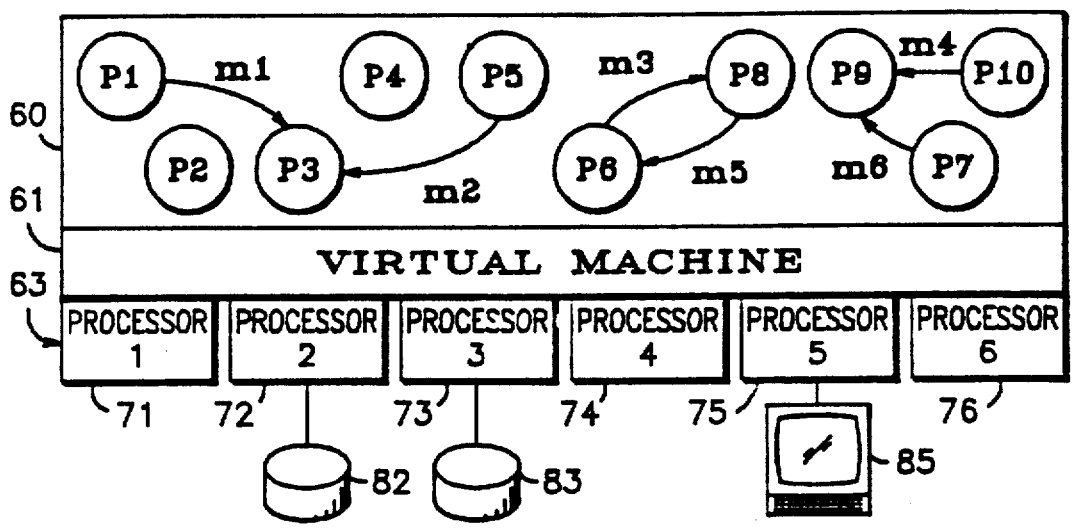
FIG. 3 shows an architectural model of a data processing system incorporating the present invention.

With reference to FIG. 3, an architectural model of the present invention is shown. The bottom, or hardware, layer 63 comprises a number of processors 71-76, as described above. The processors 71-76 may exist physically within one or more cells. The top, or software, layer 60 illustrates a number of processes P1-P10 which send messages m1-m6 to each other. The middle layer 61, labelled "virtual machine", isolates the hardware from the software, and it allows programs to be written as if they were going to be executed on a single processor. Conversely, programs can be distributed across multiple processors without having been explicitly designed for that purpose.

An important purpose of the virtual machine concept herein-disclosed is to provide the applications programmer with a simple, consistent model in which to design his system. This model, as mentioned above, is reduced to several elemental concepts: processes, messages, and contexts, each of which will be defined and discussed in detail below. As a consequence of this elemental model, hardware peculiarities are made transparent to the user, and changes in hardware configurations have no direct effect on the software.

The Virtual Machine

A "process" is a self-contained package of data and executable procedures which operate on that data. The data is totally private and cannot be accessed by other processes. There is no concept of shared memory within the present invention. Execution of a process is strictly sequential. Multiple processes execute concurrently and must be scheduled by the operating system. The processes can be re-entrant, in which case only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a "pointer" to a process.

Every process also has a "name" which is a variable-length string of characters assigned by the programmer. A name need not be unique, and this ambiguity may be used to add new services transparently and to aid in fault-tolerance.

Figure 4:
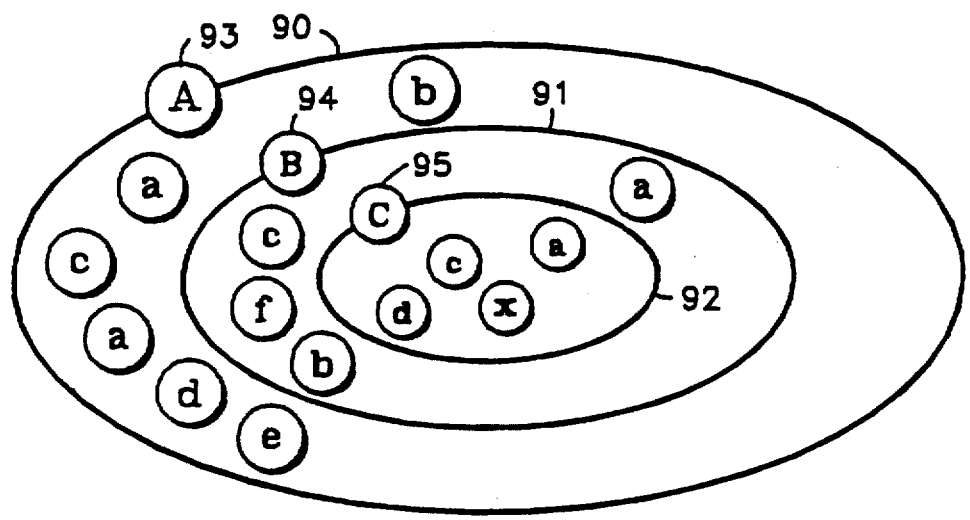
FIG. 4 shows the relationship between software contexts and processes as they relate to the present invention.

FIG. 4 illustrates that the system-wide name space is partitioned into distinct subsets by means of "contexts" identified by reference numerals 90-92. A context is simply a collection of related processes whose names are not known outside of the context. Context 90, for example, contains processes A, a, a, b, c, d, and e. Context 91 contains processes B, a, b, c, and f. And context 92 contains processes C, a, c, d, and x.

One particular process in each context, called the "context process", is known both within the context and within the immediately enclosing one (referred to as its "parent context"). In the example illustrated in FIG. 4, processes A-C are context processes for contexts 90-92, respectively. The parent context of context 91 is context 90, and the parent context of context 92 is context 91. Conceptually, the context process is located on the boundary of the context and acts as a gate into it.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context process is to filter incoming messages and either reject them or reroute them to other processes in its context. Contexts may be nested, allowing a hierarchy of abstractions to be constructed. A context must reside completely on one cell. The entire system is treated as an all-encompassing context which is always present and which is the highest level in the hierarchy. In enssence, contexts define localized protection domains and greatly reduce the chances of unintentional naming conflicts.

If appropriate, a process inside one context can be "connected" to one inside another context by exchanging PID's, once contact has been established through one or the other of the context processes. Most process servers within the present invention function that way. Initial access is by name. Once the desired function (such as a window or file) is "opened", the user process and the service communicate directly via PID's.

A "message" is a variable-length buffer (limited only by the processor's physical memory size) which carries information between processes. A header, inaccessible to the programmer, contains the destination name and the sender's PID. By convention, the first field in a message is a null-terminated string which defines the type of message (e.g., "read", "status", etc.) Messages are queued to the receiving process when they are sent. Queuing ensures serial access and is used in preference to semaphores, monitors, etc.

Messages provide the mechanism by which hardware transparency is achieved. A process located anywhere in the virtual machine can send a message to any other process if it knows its name. Transparency applies with some restrictions across bridgeways (i.e., the interfaces between LAN's operating under identical network protocols) and, in general, not at all across gateways (i.e., the interfaces between LAN's operating under different network protocols) due to performance degradation. However, they could so operate, depending upon the required level of performance.

Figure 5:
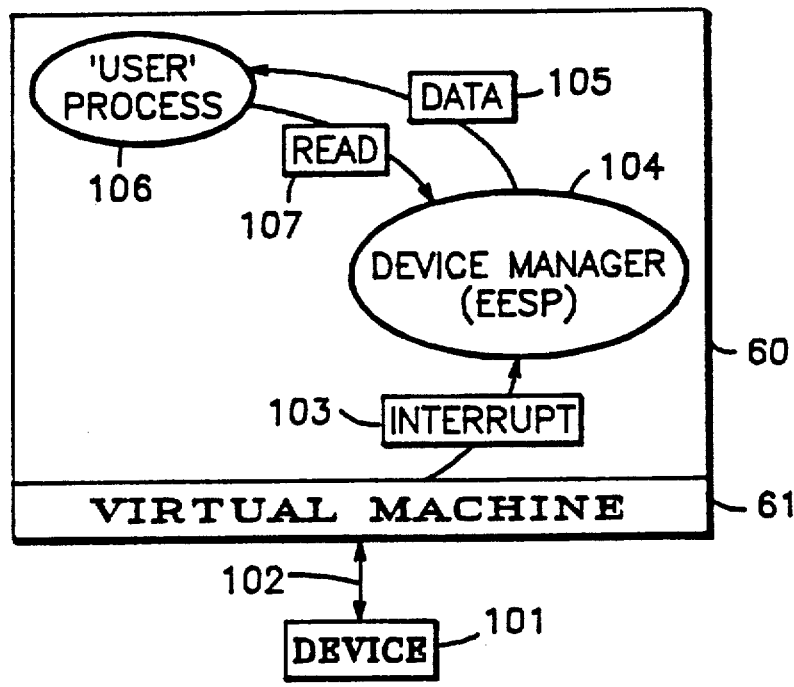
FIG. 5 shows the relationship between external events and processes.

With reference now to FIG. 5, the relationship of external events to processes will now be described. The virtual machine makes devices look like processes. For example, when an interrupt occurs in an external device 101, the virtual machine kernel 61 queues an interrupt message 103 to a specific process 104, known as an "external event service process" (EESP), functioning as the device manager. For efficiency, the message is pre-allocated once and circulates between the EESP and the kernel. The message contains just enough information to indicate the ocurrence of the event. The EESP performs all hardware-specific functions related to the event, such as setting control registers, moving data 105 to a user process 106, transmitting "Read" messages from the user process 106, etc., and then "releasing" the interrupt.

To become an EESP, a process issues a "connect" primitive specifying the appropriate device register(s). It must execute a "disconnect" before it exits. Device-independence is achieved by making the message protocol between EESP's and applications processes the same wherever possible.

Inter-Process Communication

All inter-process communication is via messages. Consequently, most of the virtual machine primitives are concerned with processing messages. The virtual machine kernel primitives are the following:

ALLOC—requests allocation of a (message) buffer of a given size.

FREE—requests deallocation of a given message buffer.

PUT—end a message to a given destination (by name or PID).

GET—wait for and dequeue the next incoming message, optionally from a specific process (by PID).

FORWARD—pass a received message through to another process.

CALL—send a message, then wait for and dequeue the reply.

REPLY—send a message to the originator of a given message.

ANY_MSG—returns "true" if the receive queue is not empty, else returns "false"; optionally, checks if any messages from a specific PID are queued.

To further described the function of the kernel primitives, ALLOC handles all memory allocations. It returns a pointer to a buffer which can be used for local storage within the process or which can be sent to another process (via PUT, etc.). ALLOC never "fails", but rather waits until enough memory is freed to satisfy the request.

The PUT primitive queues a message to another process. The sending process resumes execution as soon as the message is queued.

FORWARD is used to quickly reroute a message but maintain information about the original sender (whereas PUT always makes the sending process the originator of the message).

REPLY sends a message to the originator of a previously received message, rather than by name or PID.

CALL essentially implements remote subroutine invocations, causing the caller to suspend until the receiver executes a REPLY. Subsequently, the replied message is dequeued out of sequence, immediately upon arrival, and the caller resumes execution.

The emphasis is on concurrency, so that as many processes as possible are executed in parallel. Hence neither PUT nor FORWARD waits for the message to be delivered. Conversely, GETS suspends a process until a message arrives and dequeues it in one operation. The ANY_MSG primitive is provided so that a process may determine whether there is anything of interest in the queue before committing itself to a GET.

Figure 6:
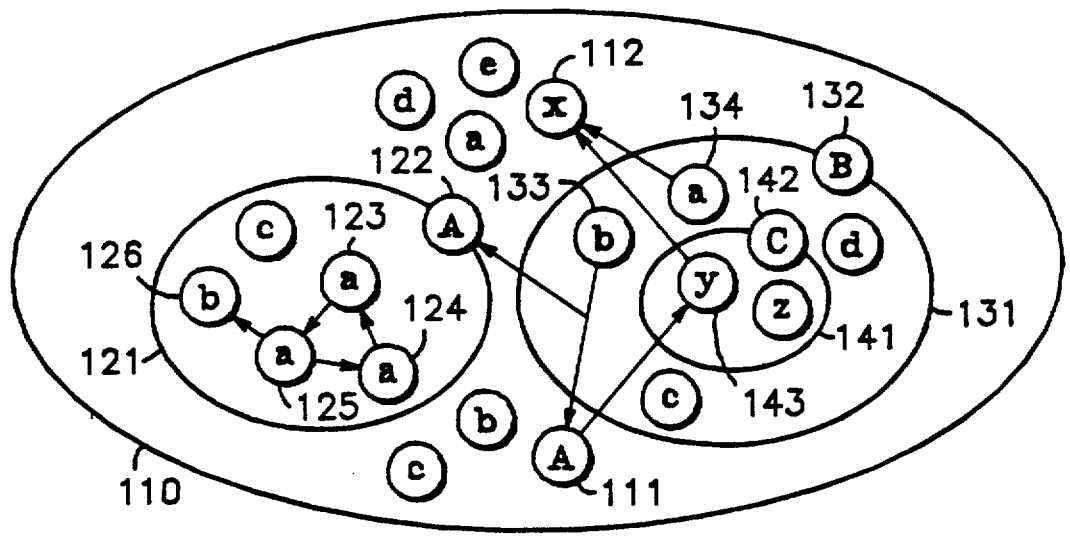
FIG. 6 shows how messages may be sent between processes within nested contexts.

When a message is sent by name, the destination process must be found in the name space. The search path is determined by the nesting of the contexts in which the sending process resides. From a given process, a message can be sent to all processes in its own context or (optionally) to those in any higher context. Refer to FIG. 6. The contexts are searched from the current one upward until a match is found or until the system context is reached. All processes with the same name in that context are then queued a copy of the message.

For example, with reference to FIG. 6, assume that in context 141 process y sends a message to ALL processes by the name x. Process y first searches within its own context 141 but finds no process x. The process y searches within the next higher context 131 (its parent context) but again finds no process x. Then process y searches within the next higher context 110 and finds a process x, identified by reference numeral 112. Since it is the only process x in context 110, it is the only recipient of the message from process y.

If process a in context 131 sends a message to ALL processes by the name x, it first searches within its own context 131 and, finding no processes x there, it then searches within context 110 and finds process x.

Assume that process b in context 131 sends a message to ALL processes by the name A. It would find process A (111) in context 110, as well as process A (122) which is the context process for context 121.

A process may also send a message to itself or to its context process without knowing either name explicitly.

The concept of a "logical ring" (analogous to a LAN) allows a message to be sent to the NEXT process in the system with a given name. The message goes to exactly one process in the sender's context, if such a process exists. Otherwise the parent context is searched.

The virtual machine guarantees that each NEXT transmission will reach a different process and that eventually a transmission will be sent to the logically "first" process (the one that sent the original message) in the ring, completing the loop. In other words, all processes with the same name at the same level can communicate with each other without knowing how many there are or where they are located. The logical ring is essential for distributing services such as a data base. The ordering of processes in the ring is not predictable.

For example, if process a (125) in context 121 sends a message to process a using the NEXT primitive, the search finds a first process a (124) in the same context 121. Process a (124) is marked as having received the message, and then process a (124) sends the message on to the NEXT process a (123) in context 121. Process a (123) is marked as having received the message, and then it sends the message on to the NEXT process a, which is the original sender process a (125), which knows not to send it further on, since it's been marked as having already received the message.

Sending messages directly by PID obviates the need for a name search and ignores context boundaries. This is known as the DIRECT mode of transmission and is the most efficient. For example, process A (111) sends a message in the DIRECT mode to process y in context 141.

If a process sends a message in the LOCAL transmission mode, it sends it only to a process having the given name in the sender's own context.

In summary, including the DIRECT transmission mode, there are five transmission modes which can be used with the PUT, FORWARD, and CALL primitives:

ALL—to all processes with the given name in the first context which contains that name, starting with the sender's context and searching upwards through all parent contexts.

LOCAL—to all processes with the given name in the sender's context only.

NEXT—to the next process with the given name in the same context as the sender, if any; otherwise it searches upwards through all parent contexts until the name is found.

LEVEL—sends to "self" (the sending process) or to "context" (the context process corresponding to the sender's context); "self" cannot be used with CALL primitive.

DIRECT—sent by PID.

Messages are usually transmitted by queueing a pointer to the buffer containing the message. A message is only copied when there are multiple destinations or when the destination is on another cell.

Operating System

The operating system of the present invention consists of a kernel, which implements the primitives described above, plus a set of processes which provide process creation and termination, time management (set time, set alarm, etc.) and which perform cell start-up and configuration. Drivers for devices are also implemented as processes (EESP's), as described above. This allows both system services and device drivers to be added or replaced easily. The operating system also supports swapping and paging, although both are invisible to applications software.

Unlike known distributed computer systems, that of the present invention does not use a distinct "name server" process to resolve names. Name searching is confined to the kernel, which has the advantage of being much faster.

A minimal bootstrap program resides permanently (in ROM) on every cell, e.g. ROM 28 in cell N of FIG. 2. The bootstrap program executes automatically when a cell is powered up and begins by performing basic on-board diagnostics. It then attempts to find and start an initial system code module which comprises the entire kernel, and EESP's for the clock, disk (if required), and NIM (if required). The module is sought on the first disk drive on the cell, if any. If there isn't a disk, and the cell is on the LAN, a message will be sent out requesting the module. Failing that, the required software must be resident in ROM. System services for the clock and for process creation, an initialization program, and a minimal file system, are also built into the module. The initialization program sets up all of the kernel's internal tables and then calls predefined entry points in each of the preloaded services (file management, etc.). The net result is that EESP's for the attached devices are scheduled to run, and the cell is available.

In general, there exists a template file describing the initial software and hardware for each cell in the system. The template defines a set of initial processes (usually one per service) which are scheduled immediately after the cell start-up. These processes then start up their respective subsystems. A cell configuration service on each cell sends configuration messages to each subsystem when it is being initialized, informing it of the devices it owns. Thereafter, similar messages are sent whenever a new device is added to the cell or a device fails or is removed from the cell.

Thus there is no well-defined meaning for "system up" or "system down"—as long as any cell is active, the system as a whole may be considered to be "up". Cells can be shut down or started up dynamically without affecting other cells on the network. The same principle applies, in a limited sense, to peripherals. Devices which can identify themselves with regard to type, model number, etc. can be added or removed without operator intervention. The operating system cannot maintain a global status of the system, nor does it attempt to centralize control of the entire system.

Data Management

The present invention allows the user to store and retrieve data at several levels of abstraction. At various levels it provides device-independence, transparency, multiple views of the same data and support for transaction processing. Transparency means that a process need not know where a file is stored in order to access it. It also means that the file can be moved to another device without affecting the process. Only as many levels as are required for a particular application need be included in the system.

Figure 7:
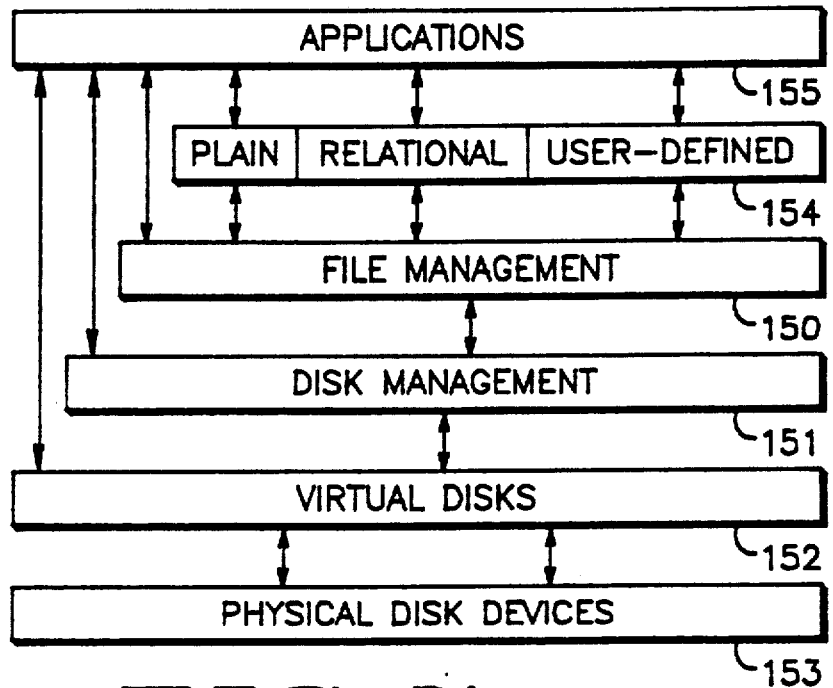
FIG. 7 shows an architectural model of the improved data management system incorporating the present invention.

Referring now to FIG. 7, the lowest level of data management is the physical disk layer 153, which is completely hidden from all applications software 155. Immediately above this level are virtual disks 152 which define an interface in terms of linear arrays of 1K blocks, regardless of the actual medium. Although the usual medium is disk, RAM may also be used (for temporary files) to improve performance. Three types of messages are supported at this level: "initial", to format the virtual disk, and "read" and "write" to access specific blocks.

The third level, disk management 151, organizes data within a virtual disk by means of indices. A disk index is a file at this level and is viewed as an extensible linear array of bytes. Messages are accepted to initialize the disk, allocate and delete indices, and read and write indices. The later two functions operate starting at a given byte offset for a given byte length. An index is automatically extended when a request references a location outside the current limits. Physical storage is allocated only when data is actually written. Optional data caching is supported at the disk management level on a per cell basis.

File management 150 is layered on top of disk management 151 and introduces the concept of a "file system". A file system is a collection of named files (or named indices, in terms of the disk management layer 151). The name space constitutes a flat (single-level) directory which is allocated when the file system is initialized. A name may be up to 64 characters long and is hashed into the directory. Unnamed files are useful for building complex disk structures which are logically linked to each other, such as a hierarchical file directory or a database, or for temporary files which only the creator will use.

Transparency is supported only at the file management level 150 and above. It is used by simply omitting the file system name from the request (NEW, DELETE, RENAME, or OPEN). In this case, the request is forwarded through all file systems until the given file name is found.

The highest level 154 of data management deals in terms of "metaphors", which implement application-specific views of the data. A relational database is one example of a metaphor. Complex operations such as multi-user synchronization and record- or field-locking may be implemented at this level. The present invention supports two built-in views of the data: "plain" files, which are superficially equivalent to UNIX ™ files, and a relational database.

Figure 8:
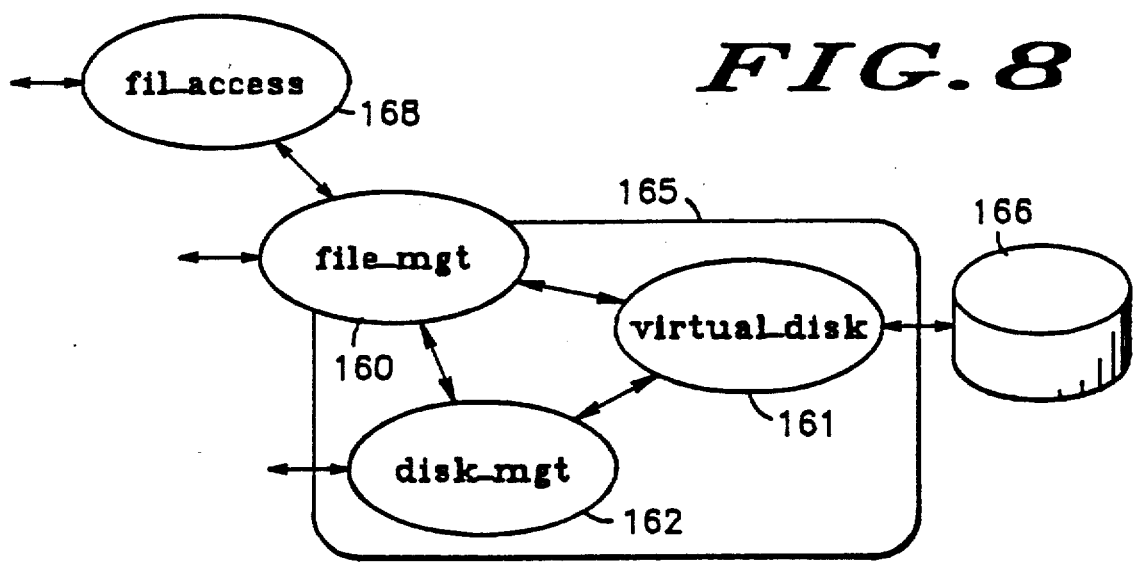
FIG. 8 shows an architectural software model of the improved data management system incorporating the present invention.

FIG. 8 illustrates the design of the data management software up to the plain-file level. Each active (mounted) file system 165 is represented by a file management context 160. The set of all such contexts forms a logical ring for purposes of message transmission; in other words, they all have the same name ("file_mgt"). The actual name of the file system (stored on the disk 166 at initialization) is known only to the context process.

In the plain-file metaphor, there is exactly one process for each open file, acting as a server for that file. That process (an instance of "fil_access") can be located in the appropriate file management context, or any application can create its own private copy of the process. The process allows standard file management functions (NEW, DELETE, RENAME, OPEN, and CLOSE) plus SEEK, LOCK (lock the entire file against access by processes other than the owner) and UNLOCK. Note that a given file process is only opened once, by its owner. If not locked, any other processes which know its name or PID can read and write the file. Protection is provided through normal process name-scoping. Protection via passwords or a similar mechanism are in general unsupported unless supported by another metaphor.

Human Interface

The human interface (HI) of the present invention provides a set of tools with which an end user can construct a package specific to his applications requirements. Such a package is referred to as a "metaphor", since it reflects the user's particular view of the system. Multiple metaphors can be supported concurrently. One representative metaphor is, for example, a software development environment.

The purpose of the HI metaphor is to allow consistent, integrated access to the data and functions available in the system. Since user's perceptions of the system are based largely on the way they interact with it, it is important to provide an interface with which they feel comfortable. The HI allows a systems designer to create a model consisting of objects that are familiar to the end user and a set of actions that can be applied to them.

The fundamental concept of the HI is that of the "picture". All visually-oriented information, regardless of interpretation, is represented by pictures. A picture (such as a diagram, report, menu, icon, etc.) is defined in a device-independent format which is recognized and manipulated by all programs in the HI and all programs using the HI. It consists of "picture elements", such as "line", "arc", and "text", which can be stored compactly and transferred efficiently between processes. All elements have common attributes like color and fill pattern. Most also have type-specific attributes, such as typeface and style for text. Pictures are drawn in a large "world" co-ordinate system composed of "virtual pixels".

Because all data is in the form of pictures, segments of data can be freely copied between applications, e.g., from a live display to a word processor. No intermediate format or conversion is required. One consequence of this is that the end user or original equipment manufacturer (OEM) has complete flexibility in defining the formats of windows, menus, icons, error messages, help pages, etc. All such pictures are stored in a library rather than being built into the software and so are changeable at any time without reprogramming. A comprehensive editor is available to define and modify pictures on-line.

All interaction with the user's environment is through either "virtual input" or "virtual output" devices. A virtual input device accepts keyboards, mice, light pens, analog dials, pushbuttons, etc. and translates them into text, cursor-positioning, action, dial, switch, and number messages. All physical input devices must map into this set of standard messages. Only one process, an input manager for the specific device, is responsible for performing the translation. Other processes can then deal with the input without being dependent on its source.

Similarly, a virtual output manager translates standard output messages to the physical representation appropriate to a specific device (screen, printer, plotter, etc.) A picture drawn on any terminal or by a process can be displayed or printed on any device, subject to the physical limitations of that device.

Figure 9:
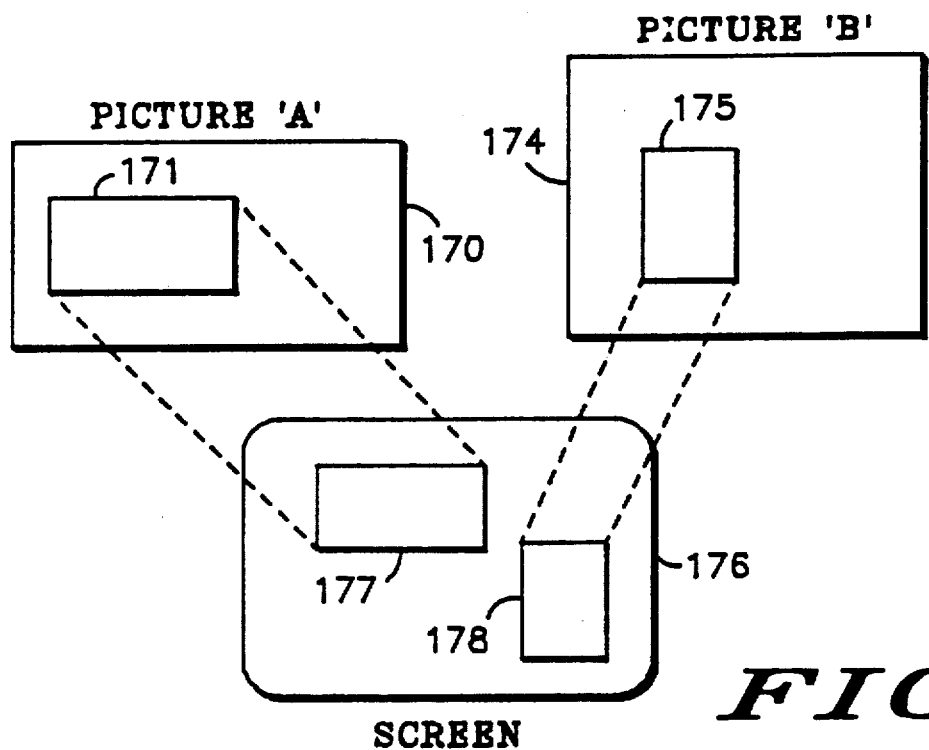
FIG. 9 shows the relationship between pictures, views, and windows in the human interface of a data processing system incorporating the present invention.

With reference to FIG. 9, two "pictures" are illustrated—picture A (170) and picture B (174).

The concept of a "view" is used to map a particular rectangular area of a picture to a particular device. In FIG. 9, picture A is illustrated as containing at least one view 171, and picture B contains at least one view 175. Views can be used, for example, to partition a screen for multiple applications or to extract page-sized subsets of a picture for printing.

If the view appears on a screen it is contained in a "window". With reference again to FIG. 9, view 171 of picture A is mapped to screen 176 as window 177, and view 175 of picture B is mapped as window 178.

The HI allows the user to dynamically change the size of the window, move the window around on the screen, and move the picture under the window to view different parts of it (i.e., scroll in any direction). If a picture which is mapped to one or more windows changes, all affected views of that picture on all screens are automatically updated. There is no logical limit to the number or sizes of windows on a particular screen. Since the system is distributed, it's natural for pictures and windows to be on different cells. For example, several alarm displays can share a single, common picture.

The primary mechanism for interacting with the HI is to move the cursor to the desired object and "select" it by pressing a key or button. An action may be performed automatically upon selection or by further interaction, often using menus. For example, selecting an icon usually activates the corresponding application immediately. Selecting a piece of text is often followed by selection of a command such as "cut" or "underline". Actions can be dynamically mapped to function keys on a keyboard so that pressing a key is equivalent to selecting an icon or a menu item. A given set of cursors (the cursor changes as it moves from one application picture to another), windows, menus, icons, and function keys define a "metaphor".

The HI builds on the above concepts to provide a set of distributed services. These include electronic mail, which allows two or more users at different terminals to communicate with each other in real time or to queue files for later delivery, and a forms manager for data entry. A subclass of windows called "virtual terminals" provides emulation of standard commercially available terminals.

Figure 10:
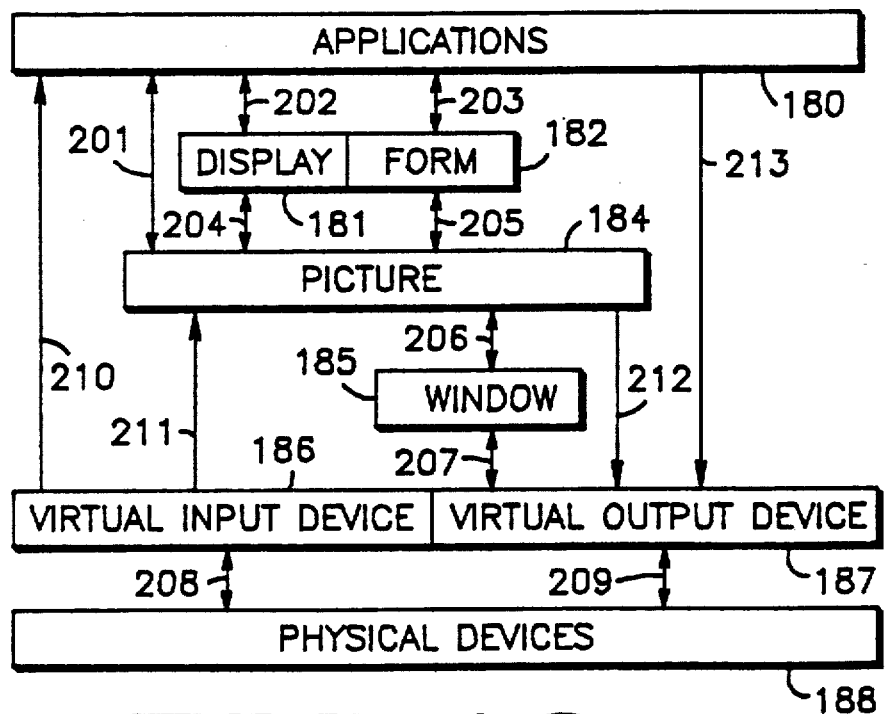
FIG. 10 shows a conceptual view of the different levels of human interface within a data processing system incorporating the present invention.

FIG. 10 shows the different levels of the HI and data flow through them. Arrows 201-209 indicate the most common paths, while arrows 210-213 indicate additional paths. The interface can be configured to leave out unneeded layers for customized applications. The philosophy behind the HI design dictates one process per object. That is, a process is created for each active window, picture, input or output device, etc. As a result, the processes are simplified and can be distributed across cells almost arbitrarily.

Error Management

An error management service is provided to catch errors and report them to the appropriate process(es). It serves as a foundation upon which more sophisticated diagnostics and/or recovery schemes may be constructed. The system can intercept processor internal exceptions (bus and address errors, "trap" instructions, etc.), external exceptions (such as a spurious interrupts), device faults, and software-defined errors. The latter category is open-ended and comprises unexpected termination of a process, the result of a diagnostic program, or in general any error detected by the kernel or by any process. Failure to find the destination of a transmitted message is one example. While internal exceptions can be associated with the particular process which caused the error, external exceptions are independent, although they may directly impact one or more processes.

In summary, the prime functions of the error management service are to: (1) classify and log errors, (2) generate notification messages, (3) accept requests to configure the service and specify options, (4) accept software error messages from other subsystems, and (5) terminate affected processes, if required. Item (3) above allows applications and services to indicate that they want to know about specific errors or classes of errors. Options include automatic logging, automatic display on the operator's terminal, automatic suspension (for debugging) or abortion of the offending process, and automatic dumping of the process image to a file. The default actions, if no options have been specified, are termination, logging and display. Any outstanding request can be cancelled at any time.

The HI logging service provides the facility to store error messages in a chronological file, maintain a hardcopy log, and create a dynamic display of errors, ordered by time, priority, class, etc. The debugger is often invoked upon occurrence of a process error to examine the process' state for clues.

DETAILED DESCRIPTION OF THE INVENTION

Figure 11:
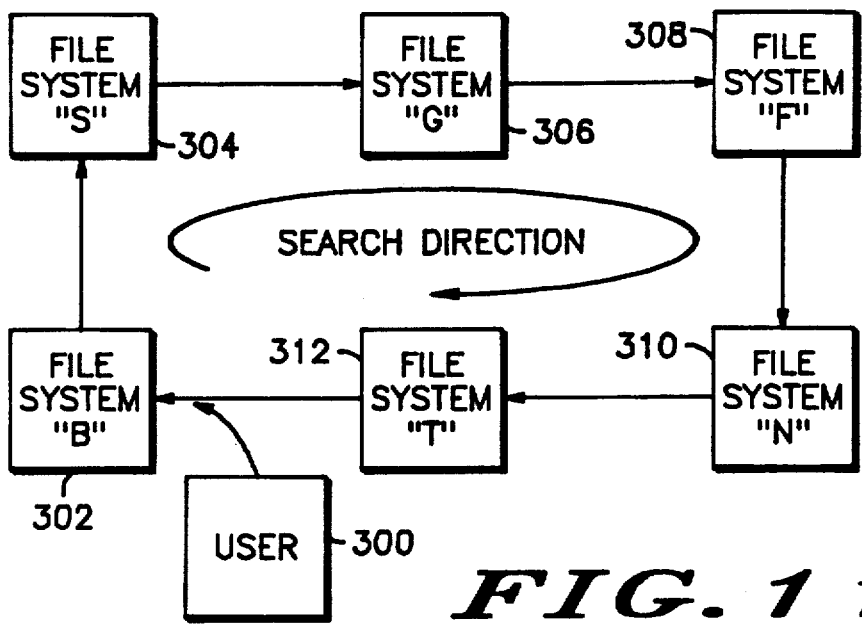
FIG. 11 shows a block diagram of a logical ring of file systems, illustrating how an access request to a file system is handled by the present invention.

Referring now to FIG. 11, a block diagram is shown of a logical ring of file systems, illustrating how an access request to a file system is handled by the present invention. Each mounted disk volume in the distributed data processing system of the present invention constitutes a file system. Each file system is managed by a file management context whose architecture is represented by FIG. 8. On a relatively large system there may be any number of active file systems (i.e. active file management contexts), where each file management context has the name "file_mgt". The set of these contexts is connected together in a logical ring, as shown in FIG. 11.

The name of file system is established when a disk volume is initialized. The file system name is written into the volume header on the disk. When a file management context starts up, it attempts to read the volume header of its associated disk. If successful, the volume name is read and becomes the name of the file system which that context manages. If unsuccessful, the volume is marked as uninitialized. Thereafter only an INITIAL command is accepted.

Within a file management context, requests which reference a file by name (NEW, DELETE, RENAME, OPEN, and CLOSE) are sent to the context process "file_mgt". Requests which access data (READ and WRITE) are sent directly by their PID to the disk_mgt process within the file management context. This PID, as well as the associated disk index, is returned in the reply to a successful NEW or OPEN command. This connects the user (e.g., a data management process) to a specific file allocation on a specific volume.

As shown in FIG. 11, all active file management contexts are viewed as forming a logical ring. Requests referencing a file by name are sent to the context process named "file_mgt" using transmission mode NEXT. Each context process "file_mgt" determines whether the request is for the file system which it manages, and, if it is not, it forwards the request to the next context "file_mgt". If a request circulates the logical ring without success, then it is returned to the caller with an error indication.

In FIG. 11, assume that a user 300 (e.g. an application context) initiates a file access request to a certain "TEMP" file in file system "G" 306. The file access request is first received by the "file_mgt" context process of file system "B" 302, which determines that the request is not for file system "B" and forwards it to file system "S" 304. Likewise, file system "S" 304 forwards the request on to file system "G" 306. The "file_mgt" context process of file system "G" 306 recognizes that the request is intended for this file system and then responds to user 300 that it will attempt to satisfy the request.

Had the file access request circulated the entire loop without success, it would have returned to user 300 with an error message. To prevent the request from recirculating the loop, once a given file system (e.g. file system "B" 302) fails to satisfy the request, it records an indication that it has attempted to satisfy this particular request, so that it doesn't reattempt to satisfy the request on any wrap-around.

A file access request may either specify both a file system name and a file name, or it may simply specify a file name. Data residence transparency is achieved by not specifying the file system name. Suppose, for example, that user 300 doesn't know on which file system a desired file is located or doesn't care where a file is to be opened. In this case, an attempt is made by each successive "file_mgt" context to satisfy the request of user 300. Thus the set of all disk volumes in the system may be considered one large disk space, and the user doesn't have to know on which file system any given file is logically or physically located.

For example, assume user 300 initiates a file access request to a file "ABC" without specifying the file system name. File system "B" 302 will first attempt to satisfy the request. However, if it's unable to, e.g. because of insufficient space, it forwards the request on to file system "S" 304. If file system "S" 304 is capable of satisfying the request, it so notifies user 300. Otherwise, the request continues on to each file system in turn until one is able to satisfy the request. If none is able to satisfy the request, an error message is returned to user 300. As mentioned above, once a file system fails to satisfy the request, it marks the attempt, so that it doesn't attempt to satisfy the request if the request circulates around the entire loop without being satisfied.

Figure 12:
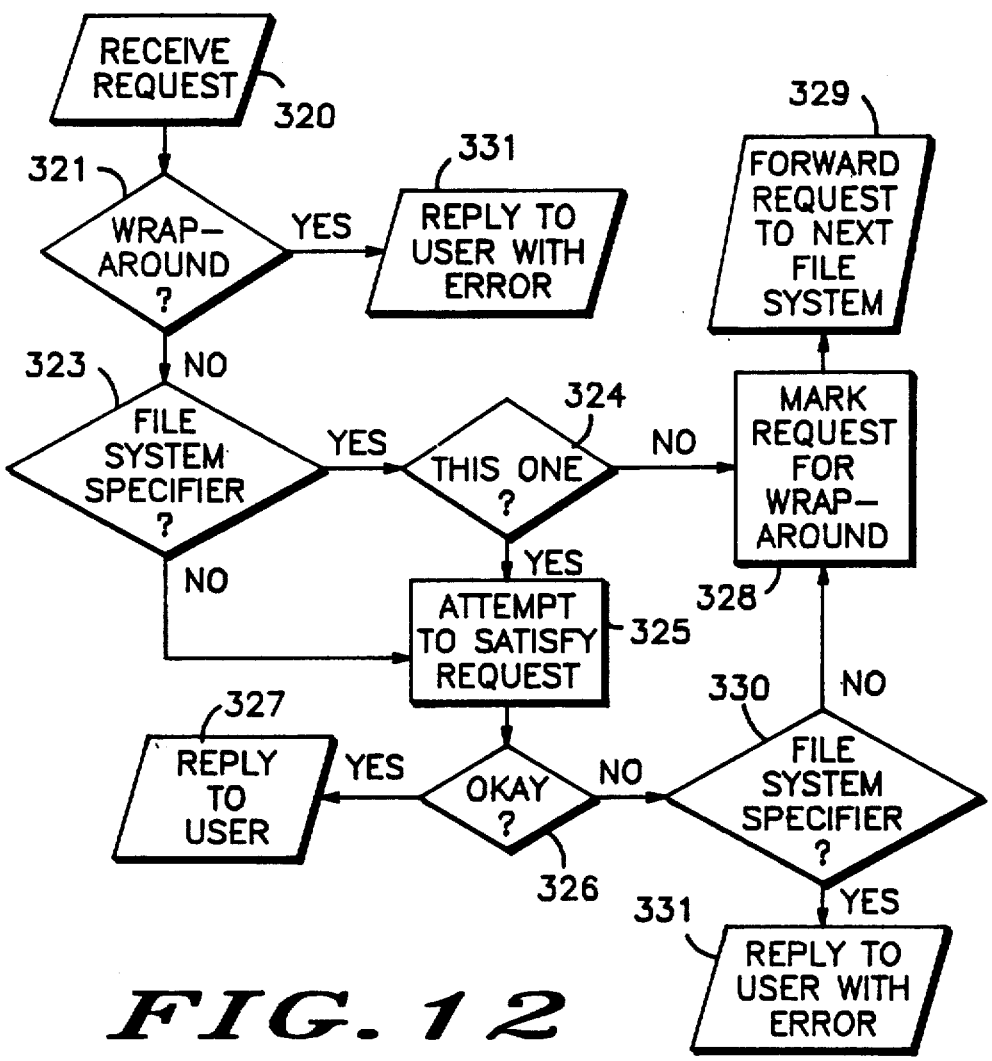
FIG. 12 shows a flow diagram illustrating the operation of the improved data management system of the present invention.

The flow diagram of FIG. 12 illustrates how a file access request is handled by the present invention. A file access request is received in block 320. Decision block 321 queries whether this is a wrap-around. If so, an error message is sent to the user, as indicated by block 322. If not, the procedure passes to decision block 323, which queries whether a file system has been specified. If not, this particular file system attempts to satisfy the request, as indicated by block 325. If so, decision block 324 queries whether this particular file system is the one specified. If so, this particular file system attempts to satisfy the request.

If this is not the file system specified, then the request is marked for wrap-around, as shown by block 328, and the request is forwarded to the next file system, as shown by block 329.

If the request can be satisfied (block 326), then the user is so informed (block 327). If not, decision block 330 queries whether a file system was specified. If so, an error message is sent to the user, as indicated by block 331. If not, the request is marked for wrap-around (block 328), and the request is forwarded to the next file system (block 329).

Appendix A contains a "C" language implementation of the flow diagram shown in FIG. 12.

Appendix B is a detailed description of the relevant portions of the source code listing of Appendix A.

It will be apparent to those skilled in the art that the herein disclosed invention may be modified in numerous ways and may assume many embodiments other than the preferred form specifically set out and described above. For example, a file system may obviously occupy some other physical device, or portion or grouping thereof, other than a disk volume, as disclosed above.

Accordingly, it is intended by the appended claims to cover all modifications of the invention which fall within the true spirit and scope of the invention.

APPENDIX A

PROGRAM LISTING

The following portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

```
9         Module           : file_mgt.c 1.12  file_mgt.c
10        Date submitted   : 85/03/07    14:09:29
11        Author           : Bruce Mansfield
12        DESCRIPTION -
13        ---------------------------------------------------------.
14   */
15   #ifndef lint
16   static char SrcId[] = "?(#) file_mgt.c:1.12";
17   #endif
18   /**********************************/
19   /*                                */
20   /*   D A T A   M A N A G E M E N T   */
21   /*                                */
22   /*         file_mgt.c             */
23   /*                                */
24   /**********************************/
25
```

```
26    #include <local/cx.h>
27    #include <local/os/clock.h>
28    #include <local/dm/dmcfg.h>
29    #include <local/dm/dmtyps.h>
30
31
32    bool getdir(), putdir(), deldir(), rddir(), wrtdir(), vol_init();
33    bool findfil(), findir();
34
35
36    file_mgt()
37    {
38        register fil_io *msg;
39        register char *s;
40        register stat *reply;
41        register stat2 *reply2;
42        register dsk_io *dmsg;
43        bool filefound;
44        register int i;
45        int fn;
46        vol_tbl  *voltbl;
47        dir_ent  root, child, child2, node, node2;
48        char     file_system[MAXFILE];
49        char     file_system2[MAXFILE];
50        char     file[MAXFILE];
51        char     file2[MAXFILE];
52        char     mode[MAXFILE];
53        long     disk_pid;
54        unsigned long size;
55        long pid;
56        bool initialized, ok, found, debug;
57        char disk_name[MAXFILE];
58
59
60
61        /* INITIALIZE */
62        voltbl = (vol_tbl *) Alloc(sizeof(vol_tbl));
63        msg = (fil_io *) Call(NEXT,"FMcreator",makemsg("init",5), _, _);
64        disk_pid = NewProc("disk_mgt","disk_mgt");
65        strncpy(disk_name, ((vol_msg *)msg)->voltbl.volname, MAXFILE);
66        Put(DIRECT, disk_pid, msg);
67        memset(voltbl,0,sizeof(vol_tbl));
68        initialized = FALSE;
69        debug       = FALSE;
70        dmsg = (dsk_io *) makemsg("read",DSKIOSIZ);
71        dmsg->index = VOLINDX;
72        dmsg->offset = 0;
73        dmsg->length = sizeof(vol_tbl);
74        reply = (stat *) Call(DIRECT,disk_pid, dmsg, _, _);
75        if (reply->ok && (reply->length == sizeof(vol_tbl))) {
76            memcpy(voltbl, reply->data, sizeof(vol_tbl));
77            initialized = eq(voltbl->id,"+cX file system+");
78        }
79        if(debug) {
80            printf("file_mgt:reply->ok:%ld reply->length:%ld vol_tbl:%ld
                    init%d \n",
```

```
81              reply->ok,reply->length,sizeof(vol_tbl),initialized);
82          printf("vol_id %s \n",voltbl->id);
83      }
84      Free(reply);
85      if (!initialized)
86          strncpy(voltbl->volname, disk_name, MAXFILE);
87
88      /* READ THE ROOT DIRECTORY NODE */
89      if (initialized) {
90          rddir(&root,0,voltbl,disk_pid);
91      }
92
93
94      /* CLOSE ANY FILES STILL OPEN */
95      if (initialized) {
96          for ( i = 2; i < voltbl->dirsize; i++) {
97              rddir(&node,i,voltbl,disk_pid);
98              if (!node.directory) {
99                  node.exclusive = FALSE;
100                 node.readwrite = FALSE;
101                 node.opencnt = 0;
102                 wrtdir(&node,voltbl,disk_pid);
103             }
104         }
105     }
106
107
108
109
110     /* GET AND PARSE NEXT MESSAGE */
111     do_forever {
112         msg = (fil_io *) Get(_,&pid,&size);
113         if (!(file[0] == '/')) {
114             reply_err(msg,"Pathnames must be full");
115             continue;
116         }
117         if (!findir(msg,msg->file,file_system,file,root,node,
                voltbl,disk_pid)) {
118             if (strlen(file_system) == 0) {
119                 if (!msg->pid) msg->pid = disk_pid;
120                 Forward(NEXT,"file_mgt",msg);
121             } else {
122                 reply_err(msg,"File not found");
123             }
124         }
125         fn = parse(msg,mode,file_system,voltbl,disk_pid);
126         switch (fn) {
127
128
129
130
131
132         case INITIAL: {
133             if(debug) {
134                 printf(" file_mgt: INITIAL    \n");
135             }
136             if (strlen(file_system) ==  0) {
```

```
137                 reply_err(msg,"No initialization transparency");
138                 break;
139             }
140             if (vol_init(msg,file,voltbl,disk_pid)) {
141                 rddir(&root,0);
142                 initialized = TRUE;
143                 reply_ok(msg,voltbl->size);
144             } else
145                 initialized = FALSE;
146             break;
147         }

153         case NEW: {
154             if (debug) {
155                 printf("file_mgt: NEW    \n");
156             }
157             if (!initialized) {
158                 reply_err(msg,"File system not initialized");
159                 break;
160             }
161             if (!node.directory) {
162                 reply_err(msg,"Not a directory");
163                 break;
164             }
165             if (strlen(file) > 0) {
166                 found = findfil(&node,&child,file,voltbl,disk_pid);
167                 if (found && child.opencnt > 0) {
168                     reply_err(msg,"File exists and is currently
                            open");
169                     break;
170                 }
171             }
172             dmsg = (dsk_io *) makemsg("new",DSKIOSIZ);
173             reply = (stat *) Call(DIRECT,disk_pid,dmsg,_,_);
174             if (!reply->ok) {
175                 if (strlen(file_system) == 0) {
176                     if (!msg->pid) msg->pid = disk_pid;
177                     Forward(NEXT,"file_mgt",msg);
178                     Free(reply);
179                 } else {
180                     Reply(msg,reply);
181                     Free(msg);
182                 }
183                 break;
184             }
185             if (found) deldir(&root,&child,voltbl,disk_pid);
186             child.child = reply->length;
187             Free(reply);
188
189             /* CREATE THE FILE NAME IF NONE SUPPLIED */
190             if (strlen(file) == 0) {
191                 ascii(child.child,file);
192                 for (s = file; *s; s++);
```

```
193                scopyn(voltbl->volname,s,MAXFILE-strlen(file));
194            )
195
196            if (!eq(mode,"exclusive") && !eq(mode,"readwrite")) {
197                reply_err(msg,"Invalid mode");
198                break;
199            )
200            child.directory = FALSE;
201            child.owner = pid;
202            scopy(file,child.name);
203            gettime(&child.created);
204.           memcopy(&child.accessed,&child.created,sizeof(Time));
205            if (eq(mode,"exclusive")) child.exclusive = TRUE;
206            if (eq(mode,"readwrite")) child.readwrite = TRUE;
207            child.opencnt = 1;
208            if (putdir(&root,&node,&child,voltbl,disk_pid)) {
209                reply2 = (stat2 *) makemsg("status",STAT2SIZ);
210                scopy("OK",reply2->error);
211                reply2->index = child.child;
212                reply2->pid = disk_pid;
213                strcpy(reply2->file,"/");
214                append(reply2->file,voltbl->volname);
215                s = msg->file;
216                s++;
217                while (*s && *s != '/') s++;
218                s++;
219                append(reply2->file,s);
220                Reply(msg,reply2);
221                Free(msg);
222            ) else (
223                dmsg = (dsk_io *) makemsg("delete",DSKIOSIZ);
224                dmsg->index = child.child;
225                reply = (stat *) Call(DIRECT,disk_pid,dmsg,_,_);
226                Free(reply);
227                if (strlen(file_system) == 0) {
228                    if (!msg->pid) msg->pid = disk_pid;
229                    Forward(NEXT,"file_mgt",msg);
230                    Free(reply);
231                ) else (
232                    reply_err(msg,"Directory is full");
233                )
234            )
235            break;
236        )
237
238
239
240
241
242        case RENAME: (
243            if (debug) (
244                printf(" file_mgt: RENAME \n");
245            )
246            if (!initialized) (
247                reply_err(msg,"File system not initialized");
248                break;
249            )
```

```
250             found = findfil(&node,&child,file,voltbl,disk_pid);
251             if (found) {
252                 if (!child.directory && child.opencnt > 0) {
253                     reply_err(msg,"File is currently open");
254                     break;
255                 }
256                 found = findir(msg,msg->file2,file_system2,file2,
                        root,node2,voltbl,disk_pid);
257
258                 if (!found) {
259                     reply_err(msg,"Rename directory not found");
260                     break;
261                 }
262                 if (!node2.directory) {
263                     reply_err(msg,"Not a directory");
264                     break;
265                 }
266                 if (strlen(file2) == 0) {
267                     reply_err(msg,"Must specifiy rename file name");
268                     break;
269                 }
270                 found = findfil(&node2,&child2,file2,voltbl,disk_pid);
271                 if (found) {
272                     reply_err(msg,"Rename file already exists");
273                     break;
274                 }
275                 memcopy(&child2,&child,DIRSIZ);
276                 deldir(&root,&child,voltbl,disk_pid);
277                 putdir(&root,&node2,&child2,voltbl,disk_pid);
278                 reply_ok(msg,_);
279             } else {
280                 if (strlen(file_system) == 0) {
281                     if (!msg->pid) msg->pid = disk_pid;
282                     Forward(NEXT,"file_mgt",msg);
283                 } else
284                     reply_err(msg,"File not found");
285             }
286             break;
287         }
288
289
290
291
292         case DELETE: {
293             if (debug) {
294                 printf(" file_mgt: DELETE \n");
295             }
296             if (!initialized) {
297                 reply_err(msg,"File system not initialized");
298                 break;
299             }
300             if (node.directory) {
301                 reply_err(msg,"File is a directory");
302                 break;
303             }
304             if (node.opencnt > 0) {
```

```
305             reply_err(msg,"File is currently open");
306             break;
307         }
308         deldir(&root,&node,voltbl,disk_pid);
309         reply_ok(msg,_);
310         break;
311     }
312
313
314
315
316
317     case OPEN: {
318         if (debug) {
319             printf(" file_mgt: OPEN    \n");
320         }
321         if (!initialized) {
322             reply_err(msg,"File system not initialized");
323             break;
324         }
325         if (node.directory) {
326             reply_err(msg,"File is a directory");
327             break;
328         }
329         if (!eq(mode,"exclusive") &&
330             !eq(mode,"readwrite") &&
331             !eq(mode,"readonly")) {
332             reply_err(msg,"Invalid mode");
333             break;
334         }
335         if (node.exclusive ||
336             (eq(mode,"exclusive")  &&   node.opencnt > 0) ||
337             (eq(mode,"readwrite")  &&   node.readwrite)) {
338             reply_err(msg,"File is open; modes incompatible");
339             break;
340         }
341         if (eq(mode,"exclusive")) node.exclusive = TRUE;
342         if (eq(mode,"readwrite")) node.readwrite = TRUE;
343         node.opencnt++;
344         if (!eq(mode,"readonly")) node.owner = pid;
345         wrtdir(&node,voltbl,disk_pid);
346         reply2 = (stat2 *) makemsg("status",STAT2SIZ);
347         reply2->ok = TRUE;
348         scopy("Ok",reply2->error);
349         reply2->index = node.child;
350         reply2->pid = disk_pid;
351         strcpy(reply2->file,"/");
352         append(reply2->file,voltbl->volname);
353         s = msg->file;
354         s++;
355         while (*s  &&  *s != '/') s++;
356         s++;
357         append(reply2->file,s);
358         Reply(msg,reply2);
359         Free(msg);
360         break;
361     }
```

```
362
363
364
365
366
367             case CLOSE: (
368                 if (debug) (
369                     printf(" file_mgt: CLOSE     \n");
370                 )
371                 if (!initialized) (
372                     reply_err(msg,"File system not initialized");
373                     break;
374                 )
375                 if (node.opencnt > 0) (
376                     reply_err(msg,"File not open");
377                     break;
378                 )
379                 if (eq(mode,"exclusive"))  node.exclusive = FALSE;
380                 else if (eq(mode,"readwrite")) node.readwrite = FALSE;
381                 else if (eq(mode,"owner")) (
382                     reply_err(msg,"Close by owner not supported yet");
383                     break;
384                 ) else if(!eq(mode,"readonly")) (
385                     reply_err(msg,"Unknown close mode");
386                     break;
387                 )
388                 if (node.owner == pid) node.owner = NULL;
389                 node.opencnt--;
390                 gettime(&node.accessed);
391                 wrtdir(&node,voltbl,disk_pid);
392                 reply_ok(msg,_);
393                 break;
394             )
395
396
397
398
399             case QUERY:(
400                 if (debug) (
401                     printf(" file_mgt: QUERY file %s type %s\n",
                          file,mode);
402                 )
403                 if (!initialized) (
404                     reply_err(msg,"File system not initialized");
405                     break;
406                 )
407                 if (eq(msg->mode,"filesiz")) (
408                     if (debug) (
409                         printf("file_mgt:query %s index %5d \n",node.
                              name,node.child);
410                     )
411                     if (node.directory) (
412                         reply_ok(msg,node.opencnt);
413                         break;
414                     )
415                     dmsg = (dsk_io *) makemsg("query",DSKIOSIZ);
416                     dmsg->index = node.child;
```

```
417              dmsg->length = FILESIZ;
418              reply = (stat *)Call(DIRECT,disk_pid,dmsg,_,_);
419              if (reply->ok) {
420                  Reply(msg,reply);
421              } else {
422                  reply_err(msg,"Query failed");
423                  Free(reply);
424              }
425
426          } else if (eq(msg->mode,"syssiz")) {
427              dmsg = (dsk_io *) makemsg("query",DSKIOSIZ);
428              dmsg->length = SYSSIZ;
429              reply = (stat *) Call(DIRECT,disk_pid,dmsg,_,_);
430              if (reply->ok) {
431                  Reply(msg,reply);
432              } else {
433                  reply_err(msg,"Query failed");
434                  Free(reply);
435              }
436
437          } else if (eq(msg->mode,"freesiz")) {
438              dmsg = (dsk_io *) makemsg("query",DSKIOSIZ);
439              dmsg->length = FREESIZ;
440              reply = (stat *) Call(DIRECT,disk_pid,dmsg,_,_);
441              if (reply->ok) {
442                  Reply(msg,reply);
443              } else {
444                  reply_err(msg,"Query failed");
445                  Free(reply);
446              }
447
448          } else if (eq(msg->mode,"volsiz")) {
449              dmsg = (dsk_io *) makemsg("query",sizeof(dsk_io));
450              dmsg->length = VOLSIZ;
451              reply = (stat *) Call(DIRECT,disk_pid,dmsg,_,_);
452              if (reply->ok) {
453                  Reply(msg,reply);
454              } else {
455                  reply_err(msg,"query failed");
456                  Free(reply);
457              }
458
459          } else
460              reply_err(msg,"Unknown query subfunction");
461          break;
462      }
463
464
465
466
467
468      case NEWDIR: {
469          if (!initialized) {
470              reply_err(msg,"File system not initialized");
471              break;
472          }
473          found = findfil(&node,&child,file,voltbl,disk_pid);
```

```
474         if (found) {
475             if (!child.directory) {
476                 reply_err(msg,"Data file of same name exists");
477                 break;
478             }
479             if (child.child) {
480                 reply_err(msg,"Directory exists and is not
                        empty");
481                 break;
482             }
483             reply_ok(msg,_);
484             break;
485         }
486         child.directory = TRUE;
487         child.exclusive = FALSE;
488         child.readwrite = FALSE;
489         child.opencnt = 0;
490         if (strlen(file) == 0) {
491             reply_err(msg,"Directory name must be specified");
492             break;
493         }
494         strcpy(child.name,file);
495         gettime(&child.created);
496         memcopy(&child.accessed,&child.created,sizeof(Time));
497         putdir(&root,&node,&child,voltbl,disk_pid);
498         reply_ok(msg,_);
499         break;
500     }
501
502
503
504
505
506     case DELDIR: {
507         if (!initialized) {
508             reply_err(msg,"File system not initialized");
509             break;
510         }
511         if (!node.directory) {
512             reply_err(msg,"Not a directory");
513             break;
514         }
515         if (node.opencnt > 0) {
516             reply_err(msg,"Directory is not empty");
517             break;
518         }
519         if (deldir(&root,&node,voltbl,disk_pid))
520             reply_ok(msg,_);
521         else
522             reply_err(msg,"Not an empty directory");
523         break;
524     }
525
526
527
528
529
```

```
530        case LIST: {
531            if (!initialized) {
532                reply_err(msg,"File system not initialized");
533                break;
534            }
535            if (!node.directory) {
536                reply_err(msg,"Not a directory");
537                break;
538            }
539            reply = (stat *) makemsg("status",STATSIZ + node.
                       opencnt*DIRSIZ);
540            reply->length = 0;
541            s = reply->data;
542            if (node.child) {
543                rddir(&child,node.child,voltbl,disk_pid);
544            } else {
545                Reply(msg,reply);
546                Free(msg);
547                break;
548            }
549            do_forever {
550                memcopy(s,&child,DIRSIZ);
551                s += DIRSIZ;
552                reply->length++;
553                if (child.next)
554                    rddir(&child,child.next,voltbl,disk_pid);
555                else
556                    break;
557            }
558            Reply(msg,reply);
559            Free(msg);
560            break;
561        }
562
563
564
565
566        case DEBUGM: {
567            dmsg = (dsk_io *) makemsg("debug",DSKIOSIZ);
568            if (!strcmp(msg->mode,"on")) {
569                debug = TRUE;
570                dmsg->index = TRUE;
571            } else {
572                debug = FALSE;
573                dmsg->index = FALSE;
574            }
575            reply = (stat *) Call(DIRECT,disk_pid,dmsg,_,_);
576            if (reply->ok) {
577                Reply(msg,reply);
578            } else {
579                reply_err(msg,"Debug failed");
580                Free(reply);
581            }
582            break;
583        }
584
585
```

```
            /* THIS MESSAGE HAS WRAPPED AROUND */
            case WRAP: {
                if (debug) {
                    printf(" file_mgt: WRAP     \n");
                }
                if (msg->pid == disk_pid) {
                    if (file_system[0])
                        reply_err(msg,"File system not found");
                    else if (eq("new",msg->fn))
                        reply_err(msg,"File cannot be created");
                    else
                        reply_err(msg,"File not found");
                } else {
                    if (!msg->pid) msg->pid = disk_pid;
                    Forward(NEXT,"file_mgt",msg);
                }
                break;
            } case UNKNOWN: {
                if (debug) {
                    printf(" file_mgt: UNKNOWN     \n");
                }
                reply_err(msg,"Unknown function");
                break;
            }
        }
    }
}

/* CONVERT FUNCTION TO AN INTEGER AND CHECK FOR FILE SYSTEM
WRAPAROUND */
static int parse(msg,mode,file_system,voltbl,disk_pid)
register fil_io *msg;
char *mode;
char *file_system;
vol_tbl *voltbl;
unsigned long disk_pid;
{
    register int fn;

/* RETURN IF THIS IS A LOGICAL RING WRAP AROUND */
    if (msg->pid == disk_pid ||
    (file_system[0] && !eq(voltbl->volname,file_system)))
        return WRAP;
```

```
642
643        /* COPY MESSAGE PARAMETERS */
644        strcpy(mode,msg->mode);
645
646        /* SET THE RETURN VALUE BASED ON THE REQUESTED FUNCTION */
647        if (eq(msg->fn,"new"))      return NEW;
648        if (eq(msg->fn,"delete"))   return DELETE;
649        if (eq(msg->fn,"rename"))   return RENAME;
650        if (eq(msg->fn,"open"))     return OPEN;
651        if (eq(msg->fn,"close"))    return CLOSE;
652        if (eq(msg->fn,"initial"))  return INITIAL;
653        if (eq(msg->fn,"query"))    return QUERY;
654        if (eq(msg->fn,"newdir"))   return NEWDIR;
655        if (eq(msg->fn,"deldir"))   return DELDIR;
656        if (eq(msg->fn,"list"))     return LIST;
657        if (eq(msg->fn,"debug"))    return DEBUGM;
658        return UNKNOWN;
659    }
660
661
662
663
664
665
666
667
668    /* CONVERT PATHNAME TO A DIRECTORY NODE */
669    static bool findir(msg,name,file_system,file,root,node,voltbl,disk_pid)
670    register fil_io *msg;
671    register char *name;
672    register char *file_system;
673    register char *file;
674    register dir_ent *root;
675    register dir_ent *node;
676    vol_tbl *voltbl;
677    long disk_pid;
678    {
679        int i;
680        char *path[MAXDEPTH];
681        char pathname[MAXPATH];
682        char *s;
683        dir_ent dir;
684        bool ok;
685
686        /* SAVE PATHNAME AS SUPPLIED SO MESSAGE IS LEFT INTACT */
687        strcpy(pathname,name);
688
689        /* PARSE THE PATHNAME INTO INDIVIDUAL NODE NAMES */
690        i = 0;
691        s = pathname;
692        while (*s) {
693            if (*s == '/') {
694                *s++ = '\0';
695                path[i++] = s;
696            }
697            s++;
```

```
698              }
699              path[i] = NULL;
700
701              /* BACK COPY THE FILE SYSTEM NAME */
702              strcpy(file_system,path[0]);
703
704              /* IF THE FUNCTION IS 'new', 'newdir' OR 'rename' ADJUST THE
                 PATH LIST
705                 AND BACK COPY THE FILE NAME TO BE CREATED */
706              if (eq(msg->fn,"new") || eq(msg->fn,"newdir") ||
707                  eq(msg->fn,"rename") || eq(msg->fn,"initial")) {
708                  i--;
709                  strcpy(file,path[i]);
710                  path[i] = NULL;
711              }
712
713              /* SEARCH SUCCESSIVE DIRECTORIES FOR THE SPECIFIED DIRECTORY
                 ENTRY */
714              copy(root,&dir,DIRSIZ);
715              for (i = 1; path[i]; i++) {
716                  if (!dir.directory) return FALSE;
717                  if (!dir.child) return FALSE;
718                  ok = rddir(&dir,dir.child,voltbl,disk_pid);
719                  if (!ok) return FALSE;
720                  do_forever {
721                      if (eq(path[i],dir.name)) break;
722                      if (!dir.next) return FALSE;
723                      ok = rddir(&dir,dir.next,voltbl,disk_pid);
724                      if (!ok) return FALSE;
725                  }
726              }
727              copy(&dir,node,DIRSIZ);
728              return TRUE;
729          }
730
731
732
733
734
735
736          /* DISCOVER A FILE WITHIN A DIRECTORY */
737          static bool findfil(parent,child,file,voltbl,disk_pid)
738          dir_ent *parent;
739          dir_ent *child;
740          char *file;
741          vol_tbl *voltbl;
742          long disk_pid;
743          {
744              if (!parent->child) return FALSE;
745              if (!rddir(child,parent->child,voltbl,disk_pid)) return FALSE;
746              do_forever {
747                  if (eq(file,child->name)) return TRUE;
748                  if (!child->next) return FALSE;
749                  if (!rddir(child,child->next,voltbl,disk_pid)) return FALSE;
750              }
751          }
752
```

```
759  /* DELETE A DIRECTORY NODE */
760  static bool deldir(root,node,voltbl,disk_pid)
761  register dir_ent *root;
762  register dir_ent *node;
763  vol_tbl *voltbl;
764  long disk_pid;
765  {
766      dir_ent dir;
767      dsk_io *dmsg;
768      stat *reply;
769
770      /* DENY NODE DELETE IF NON-EMPTY DIRECTORY */
771      if (node->directory) {
772          if (node->opencnt > 0) return FALSE;
773
774      /* DELETE THE ASSOCIATED DISK INDEX */
775      } else {
776          dmsg = (dsk_io *) makemsg("delete",DSKIOSIZ);
777          dmsg->index = node->child;
778          reply = (stat *) Call(DIRECT,disk_pid,dmsg,_,_);
779          Free(reply);
780      }
781
782      /* DEQUEUE node FROM THE DIRECTORY TREE */
783      if (node->prev) {
784          rddir(&dir,node->prev,voltbl,disk_pid);
785          dir.next = node->next;
786          wrtdir(&dir,voltbl,disk_pid);
787          if (node->next) {
788              rddir(&dir,node->next,voltbl,disk_pid);
789              dir.prev = node->prev;
790              wrtdir(&dir,voltbl,disk_pid);
791          }
792      } else {
793          rddir(&dir,node->parent,voltbl,disk_pid);
794          dir.child = node->next;
795          dir.opencnt--;
796          wrtdir(&dir,voltbl,disk_pid);
797          if (node->next) {
798              rddir(&dir,node->next,voltbl,disk_pid);
799              dir.prev = NULL;
800              wrtdir(&dir,voltbl,disk_pid);
801          }
802      }
803
804      /* RETURN THE DIRECTORY ENTRY TO THE FREE LIST */
805      node->next = root->next;
806      wrtdir(node,voltbl,disk_pid);
807      root->next = node->address;
808      wrtdir(root,voltbl,disk_pid);
809      return TRUE;
```

```
810     }
811
812
813
814
815
816
817
818     /* INSERT A NODE INTO THE DIRECTORY TREE */
819     static bool putdir(root,parent,child,voltbl,disk_pid)
820     register dir_ent *root;
821     register dir_ent *parent;
822     register dir_ent *child;
823     vol_tbl *voltbl;
824     long disk_pid;
825     {
826         unsigned int n;
827         dir_ent dir;
828         bool ok;
829
830         if (root->next) {
831             n = root->next;
832             ok = rddir(&dir,n,voltbl,disk_pid);
833             if (!ok) return FALSE;
834             root->next = dir.next;
835             wrtdir(root,voltbl,disk_pid);
836             child->address = n;
837             child->next = parent->child;
838             child->prev = NULL;
839             if (child->next) {
840                 rddir(&dir,child->next,voltbl,disk_pid);
841                 dir.prev = n;
842                 wrtdir(&dir,voltbl,disk_pid);
843             }
844             child->parent = parent->address;
845             if (child->directory) child->opencnt = 0;
846             wrtdir(child,voltbl,disk_pid);
847             parent->child = n;
848             parent->opencnt++;
849             wrtdir(parent,voltbl,disk_pid);
850             return TRUE;
851         } else {
852             return FALSE;
853         }
854     }
855
856
857
858
859
860
861
862     /* READ THE SPECIFIED DIRECTORY NODE */
863     static bool rddir(node,num,voltbl,disk_pid)
864     dir_ent *node;
865     long num;
866     vol_tbl *voltbl;
```

```
867     long disk_pid;
868     {
869         return (rd(node,disk_pid,voltbl->dirindx,num*DIRSIZ+FILHDRSIZ,
            DIRSIZ));
870     }
871
872
873
874
875
876
877
878     /* WRITE THE SPECIFIED DIRECTORY NODE */
879     static bool wrtdir(node,voltbl,disk_pid)
880     dir_ent *node;
881     vol_tbl *voltbl;
882     long disk_pid;
883     {
884         int num;
885
886         num = node->address;
887         return (wrt(node,disk_pid,voltbl->dirindx,num*DIRSIZ+FILHDRSIZ,
            DIRSIZ));
888     }
889
890
891
892
893
894
895
896
897     /* INITIALIZE THE FILE SYSTEM */
898     static bool vol_init(msg,file,voltbl,disk_pid)
899     register fil_io *msg;
900     char *file;
901     vol_tbl *voltbl;
902     long disk_pid;
903     {
904         register dsk_io *dmsg;
905         register stat *reply;
906         register stat2 *reply2;
907         register char *c;
908         register long i;
909         dir_ent dir;
910         long num;
911         filhdr hdr;
912
913         /* FORMAT THE DISK */
914         dmsg = (dsk_io *) makemsg("initial",DSKIOSIZ);
915         reply = (stat *) Call(DIRECT,disk_pid,dmsg,_,_);
916         if (!reply->ok) {
917             Reply(msg,reply);
918             Free(msg);
919             return FALSE;
920         } else
921             Free(reply);
```

```
922
923     /* BUILD THE VOLUME HEADER */
924     rd(voltbl,disk_pid,VOLINDX,01,VOLTBLSIZ);
925     scopy("+cX file system+",voltbl->id);
926     scopy(file,voltbl->volname);
927     gettime(&voltbl->created);
928     dmsg = (dsk_io *) makemsg("new",DSKIOSIZ);
929     reply = (stat *) Call(DIRECT,disk_pid,dmsg,_,_);
930     if (!reply->ok) {
931         Reply(msg,reply);
932         Free(msg);
933         return FALSE;
934     }
935     voltbl->dirindx = reply->length;
936     Free(reply);
937     voltbl->dirsize = voltbl->size / BLKSPERFILE;
938     wrt(voltbl,disk_pid,VOLINDX,01,VOLTBLSIZ);
939
940     /* PREWRITE THE DIRECTORY */
941     dir.directory = TRUE;
942     dir.exclusive = FALSE;
943     dir.readwrite = FALSE;
944     dir.opencnt = 1;
945     dir.address = 0;
946     strcpy(dir.name,voltbl->volname);
947     gettime(&dir.created);
948     copy(&dir.accessed,&dir.created,sizeof(Time));
949     dir.prev = NULL;
950     dir.next = 2;    /* ADDRESS 0 = root, 1 = "cX_directory", 2 =
                        free list */
951     dir.child = 1;
952     dir.parent = NULL;
953     dir.owner = NULL;
954     wrtdir(&dir,voltbl,disk_pid);   /* WRITE THE ROOT NODE */
955     dir.directory = FALSE;
956     dir.readwrite = TRUE;
957     dir.address = 1;
958     strcpy(dir.name,"cX_directory");
959     dir.next = NULL;
960     dir.parent = 0;
961     dir.child = voltbl->dirindx;
962     dir.owner = disk_pid;
963     wrtdir(&dir,voltbl,disk_pid);   /* WRITE THE DIRECTORY FILE
                                       NODE */
964     dir.readwrite = FALSE;
965     dir.opencnt = 0;
966     dir.name[0] = '\0';
967     for (i = 2; i < voltbl->dirsize; i++) {
968         dir.address = i;
969         dir.next = i + 1;
970         if (i == voltbl->dirsize - 1) dir.next = NULL;
971         wrtdir(&dir,voltbl,disk_pid);
972     }
973
974     /* WRITE THE DIRECTORY FILE HEADER */
975     hdr.size = voltbl->dirsize * DIRSIZ;
976     wrt(&hdr,disk_pid,voltbl->dirindx,01,FILHDRSIZ);
```

```
977
978        return TRUE;
979   }

9         MODULE NAME      :  cx.h
10        SUBSYSTEM NAME   :  integration
11        DATE & TIME OF CREATION    :   84/09/19    15:27:59
12        DATE & TIME OF COMPILATION :   84/09/20    09:22:28
13        VERSION  :   1.2
14        PROGRAMMER  :   insert programmer's name
15        DESCRIPTION :
16            This include file defines some parameters which
17            are used system wide on cX, and might otherwise be multiply
18            defined. This include file replaces the previous include files
19            "cx.h", "stdtyp.h", "common.h", "kernel.h".
20
21        PARAMETERS PASSED   :
22        PARAMETERS RETURNED :
23   */
24   #define    MINPRI      0
25   #define    MAXPRI      63
26   #define    MAXNAM      16
27   #define    MAXFIL      64
28   /*
29          standard booleans
30   */
31   #define    YES         1
32   #define    NO          0
33   #define    TRUE        1
34   #define    FALSE       0
35   #define    SUCCESS     1
36   #define    FAILURE     0
37   /*
38          the pseudo storage class
39   */
40   #define    GLOBAL
41   /*
42          global values
43   */
44   #define    NULL        0L
45   #define    EOF         (-1)
46   #define    _           NULL
47   /*
48          the pseudo types
49   */
50   typedef    short       bool;
51   /*
52          std macros
53   */
54   #define    MAX(a, b) ((a) > (b) ? (a) : (b))
55   #define    MIN(a, b) ((a) < (b) ? (a) : (b))
56   #define    ABS(a) ((a) > 0 ? (a) : -(a))
57   #define    FOREVER for(;;)
58   /*
59                transmission modes
60   */
61   enum       xmit_mode  {DIRECT,LOCAL,ALL,NEXT,LEVEL} ;
62   /*
63                destination format
64   */
65   typedef union dest {
66       char *proc_name;
67       long pid;
68   } DESTINATION;
69   /*
70                kernel primitives
71   */
72   extern bool Put();
73   extern bool Forward();
74   extern char *Get();
75   extern bool Any_msg();
76   extern char *Call();
77   extern void Reply();
78   extern char *Alloc();
79   extern bool Free();
```

```
80  extern bool Connect();
81  extern void Release();
82  extern bool Disconnect();
83  extern bool Suspend();
84  extern bool Restart();
85  /*
86                  emulator or target
87  */
88  #ifdef EMULATOR
89  #define cX_main(name) \
90          main( argc, argv )                      \
91          int     argc;                           \
92          char    *argv[];                        \
93                  {                               \
94                  void    name();                 \
95                  cXe_process( argc, argv );      \
96                  name();                         \
97                  }
98          void name()
99  #else
100 #define cX_main(name) void name()
101 #endif
102
103 #ifdef CXE
104 #define PROCESS(name) \
105         main( argc, argv )                      \
106         int     argc;                           \
107         char    *argv[];                        \
108                 {                               \
109                 void    name();                 \
110                 cXe_process( argc, argv );      \
111                 name();                         \
112                 }
113         void name()
114 #else
115 #define PROCESS(name) void name()
116 #endif
``` clock.h

```
1   typedef struct TimeBin {
2           short year;
3           short month;
4           short day;
5           short Dow;
6           short hrs;
7           short min;
8           short sec;
9   } TIMEBIN;
10
11  typedef struct TimeMsg {
12          char msg_id[10];
13          union {
14                  TIMEBIN TParam_bin;
15                  char TParam_str[20];
16          } time;
17          short selector;      /* 0 = binary format, TimeBin structure;
18                                  1 = null-terminated ASCII string format */
19  } TIMEMSG;
20
21  typedef struct SignalMsg{
22          char msg_id[10];
23          TIMEBIN TParam_bin;
24          char remarks[20];
25  } SIGNALMSG;
26
27  typedef struct TimerMsg {
28          char msg_id[10];
```

```
29          unsigned long msec;
30          char remarks[20];
31    } TIMERMSG;
32
``` dmcfg.h

```
1   #define scopy(s,t) strcpy(t,s)
2   #define scopyn(s,t,n) strncpy(t,s,n)
3   #define copy(s,t,n) memcpy(t,s,n)
4   #define eq(s,t) (!strcmp(s,t))
5   #define dec(s)  strtol(s, 0L, 10)
6   #define hex(s)  strtol(s, 0L, 16)
7
8   #define MAXNAM      16
9   #define MAXFIL      64
10  #define MAXENT      MAXFIL
11  #define MAXERR      32
12  #define MAXFN       8
13  #define MAXDIM      8
14  #define MAXID       32
15  #define MAXATR      32
16  #define MAXSLOTS    255
17  #define MAXCACHE    15
18
19  #define PRIME       523
20  #define SHFTINCR    1
21  #define ONESEC      1
22
23  #define TYPINT      0
24  #define TYPASC      1
25  #define TYPFLT      2
26  #define TYPLOG      3
27  #define TYPSET      4
28  #define TYPPTR      5
29  #define TYPFIL      6
30
31  #define BLKSIZE     1024
32  #define BLKSIZ      BLKSIZE
33  #define DISKSIZE    128
34  #define BOOTINDX    -1
35  #define VOLINDX     0
36  #define VOL_TABLE   0
37  #define BLKSPERFILE 10
38
39  #define READYSIZ    10
40  #define BITS        8
41  #define BYTES       BLKSIZ
42
43  #define FIL         0
44  #define RCD         1
45  #define KEY         0
46  #define NUM         1
47
48  #define BADMSG      -1
49  #define NOP         0
50  #define UNKNOWN     0
51  #define READ        1
52  #define WRITE       2
53  #define INITIAL     3
54  #define NEW         4
55  #define DELETE      5
56  #define OPEN        6
57  #define CLOSE       7
```

```
 58    #define LOCK         8
 59    #define UNLOCK       9
 60    #define SCHEMA      10
 61    #define INPUT       11
 62    #define OUTPUT      12
 63    #define QUIT        13
 64    #define HELP        14
 65    #define WRAP        15
 66    #define SEEK        16
 67    #define DIRECTORY   17
 68    #define RENAME      18
 69    #define STARTUP     19
 70    #define QUERY       20
 71    #define FILESIZ     21
 72    #define SYSSIZ      22
 73    #define FREESIZ     23
 74    #define VOLSIZ      24
 75    #define SYNC        25
 76    #define SET         26
 77    #define AWAKE       27
 78    #define SHUTDOWN    28
 79    #define DEBUGM      29         /* 11/5/84 */
 80    #define UNMOUNT     30
 81
 82    /*     sub functions for disk_mgt    */
 83    #define MAP         1
 84    #define DATA        2
 85    #define WRMAP       3
 86    #define WRDATA      4
 87    #define DELMAP      5
 88    #define DELDATA     6
 89    #define DIRTY       7
``` dmtyps.h

```
 1    /*******************************************************/
 2    /*                                                     */
 3    /*          D A T A   M A N A G E M E N T              */
 4    /*                                                     */
 5    /*   D A T A   S T R U C T U R E S   A N D   T Y P E S */
 6    /*                                                     */
 7    /*******************************************************/
 8
 9    #include <local/os/clock.h>
10
11    /*----------------REPLY MESSAGE STRUCTURES----------------*/
12
13    typedef struct {
14            char fn[MAXFN];
15            bool ok;
16            char error[MAXERR];
17            int  length;
18            char data[2];
19    } stat;
20
21    #define STATSIZ (sizeof(stat)-2)
22
23    typedef struct {
24            char fn[MAXFN];
25            bool ok;
26            char error[MAXERR];
27            long index;
28            long pid;
29            char file[MAXFIL];
30            char file_system[MAXFIL];
31            char entry[MAXENT];
32    } stat2;
33
34    #define STAT2SIZ sizeof(stat2)
35
```

```
typedef struct {
        char fn[MAXFN];
        bool ok;
        char error[MAXERR];
        bool present;
        bool collision;
        long locker;
        char data[2];
} stat3;

#define STAT3SIZ (sizeof(stat3)-2)

typedef struct {                        /* disk status from Pd to disk_mgt */
        char fn[MAXFN];
        short lun;
        unsigned long block;
        bool ok;
        char error[MAXERR];
        int  length;
        char data[2];
} dstat;

#define DSTATSIZ (sizeof(dstat)-2)

/*--------------------INTERNAL MESSAGE STRUCTURES---------------------*/ typedef struct {
        char fn[MAXFN];
        short lun;
        unsigned long block;
        bool ok;
        char error[MAXERR];
        int length;
        char data[2];
} vir_io;

#define VIRIOSIZ (sizeof(vir_io)-2)

typedef struct {
        char fn[MAXFN];
        unsigned long index;
        unsigned long offset;
        unsigned long length;
        char data[2];
} dsk_io;

#define DSKIOSIZ (sizeof(dsk_io)-2)

typedef struct {
        dsk_io *msg;
        stat   *reply;
        unsigned long currmap;
        int j;
        int i;
        unsigned long slotnum;
        unsigned long mapnum;
        unsigned long mapcount;
        unsigned long dbpos;
        struct mp_blk *map;
} store;

#define STORSIZ sizeof(store)

typedef struct {
        char fn[MAXFN];
        long pid;
        char file_system[MAXFIL];
        char file[MAXFIL];
        char entry[MAXENT];
} fil_io ;

#define FILIOSIZ sizeof(fil_io)
```

```c
112  /*---------------------DATA TYES STRUCTURES ---------------------*/
113
114  #define PACK(a,b)      ((a<<8) | b)        /* To get the chars rght*/
115  #define PdREAD         PACK('r','e')       /* Read Something       */
116  #define PdWRITE        PACK('w','r')       /* Write it             */
117  #define PdCONFIG       PACK('c','o')       /* Configure a drive    */
118  #define PdINIT         PACK('i','n')       /* Get the # of Logicals*/
119  #define PdFORMALT      PACK('f','a')       /* Format Alternate trk */
120  #define PdFORMAT       PACK('f','o')       /* Zap the drive        */
121
122  /*-------------------DATA TYPES STRUCTURES----------------------*/
123
124  typedef struct {                           /*************************/
125      short  lun;                            /* Users Lun            */
126      short  unit;                           /* Unit #               */
127      short  SPT;                            /* # of sectors / track */
128      short  MaxHd;                          /* Max Head #           */
129      short  MaxCyl;                         /* Max Cyl #            */
130      short  precomp;                        /* Cyl to start precomp */
131      long   Sectoff;                        /* Starting Sector Offst*/
132      long   size;                           /* number of scts on drv*/
133      char   byte5;                          /* Cmd byte 5           */
134  } CFGSTR;                                  /*************************/
135
136  /****************************************************/
137  /* Format of Sector #0 (1024 byte)           */
138  /****************************************************/
139
140  typedef struct {
141      long   VID;                            /* EXORmacs Volume Id 'SYS ' */
142      long   fil0[4];
143      long   bootsect;                       /* =4; first sector 256 byt boot */
144      short  sectors;                        /* =4; # sectors boot size */
145      long   fil1;
146      long   bootat;                         /* =0x32000; load in mem here. */
147      long   fil2[27];
148      short  fil3;
149      long   mpar;                           /* =1; first media param sector */
150      char   mparlen;                        /* =1; # of media param sectors */
151      char   fil4[99];
152      char   motorola[8];                    /* = "MOTOROLA"; */
153      long   fil5;
154      short  Amask;                          /* = 0x0f-floppy 0-win Atrb Msk */
155      short  Pmask;                          /* = 0x2d0; Paramater Mask */
156      short  Aword;                          /* = 0x0f-floppy 0x10-win AtrbWd */
157      short  fil6;
158      long   fil7[3];
159      char   spt;                            /* = 0x10-floppy 0x20-win Phys */
160      char   hds;                            /* = 2-floppy, 6-Win # of heads */
161      short  cyl;                            /* = 0x50-floppy 0x132 Win # of */
162      char   Ifactr;                         /* = 1; Interleave Factor */
163      char   Sprial;                         /* = 0; Sprial Offset */
164      short  pss;                            /* = 0x100 Physical SectSize Med */
165      short  shead;                          /* = 0; starting head # */
166      short  DrvWcyl;                        /* = 0x50-Flpy 0x132 Win # cyl */
167      short  PreCompCyl;                     /* = 0x28-Flpy 0x99 Win Precomp */
168      char   fil8[58];
169      long   DataOffset;                     /* Starting sect for dat */
170      long   DataSize;                       /* # of sectors for Cx */
171      char   id[MAXID];
172      char   volname[MAXFIL];
173      unsigned long size;
174      unsigned long freelist;                /* usually block 2 */
175      unsigned long freecnt;
176      unsigned long dirindx;
177      unsigned long dirsize;
178      TIMEBIN  created;                      /* if clock.h changes then fil9 does */
179      unsigned long rl[READYSIZ];            /* the ready for alloc freelist */
180      char   fil9[494];                      /* 534 - (READYSIZ * 4) */
181  } vol_tbl;
182
183  #define VOLTBLSIZ sizeof(vol_tbl)
184
185  typedef struct vl_blk{
186      char fn[MAXFN];
```

```
187         char subfn;
188         short lun;
189         unsigned long block;
190         bool ok;
191         char error[MAXERR];
192         int length;
193         store *storage;
194         bool inuse;
195         bool dirty;
196         struct vl_blk *nextptr, *prevptr;
197         struct vl_blk *most, *least;
198         vol_tbl voltbl;
199 } vol_msg;
200
201 #define VOLUMSIZ sizeof(vol_msg)
202
203
204 typedef struct mp_blk{
205         char fn[MAXFN];
206         char subfn;
207         short lun;
208         unsigned long block;
209         bool ok;
210         char error[MAXERR];
211         int length;
212         store *storage;
213         bool inuse;
214         bool dirty;
215         struct mp_blk *nextptr, *prevptr;
216         struct mp_blk *most, *least;
217         unsigned long next;
218         unsigned long index[MAXSLOTS];
219 } map_blk;
220
221 #define MAPSIZ sizeof(map_blk)
222
223 typedef struct dt_blk{
224         char fn[MAXFN];
``` dmtyps.h

```
1   /*******************************************************/
2   /*                                                     */
3   /*          D A T A   M A N A G E M E N T              */
4   /*                                                     */
5   /*    D A T A   S T R U C T U R E S   A N D   T Y P E S */
6   /*                                                     */
7   /*******************************************************/
8
9   #include <local/os/clock.h>
10
11  /*--------------------REPLY MESSAGE STRUCTURES--------------------*/
12          :*
13  typedef struct {
14          char fn[MAXFN];
15          bool ok;
16          char error[MAXERR];
17          int length;
18          char data[2];
19  } stat;
20
21  #define STATSIZ (sizeof(stat)-2)
22
23  typedef struct {
24          char fn[MAXFN];
25          bool ok;
26          char error[MAXERR];
27          long index;
28          long pid;
29          char file[MAXFIL];
30          char file_system[MAXFIL];
31          char entry[MAXENT];
```

```
32    } stat2;
33
34    #define STAT2SIZ sizeof(stat2)
35
36
37    typedef struct {
38            char fn[MAXFN];
39            bool ok;
40            char error[MAXERR];
41            bool present;
42            bool collision;
43            long locker;
44            char data[2];
45    } stat3;
46
47    #define STAT3SIZ (sizeof(stat3)-2)
48
49
50    typedef struct {                    /* disk status from Pd to disk_mgt */
51            char fn[MAXFN];
52            short lun;
53            unsigned long block;
54            bool ok;
55            char error[MAXERR];
56            int  length;
57            char data[2];
58    } dstat;
59
60    #define DSTATSIZ (sizeof(dstat)-2)
61
62    /*---------------------INTERNAL MESSAGE STRUCTURES---------------------*/
63
64    typedef struct {
65            char fn[MAXFN];
66            short lun;
67            unsigned long block;
68            bool ok;
69            char error[MAXERR];
70            int length;
71            char data[2];
72    } vir_io;
73
74    #define VIRIOSIZ (sizeof(vir_io)-2)
75
76
77    typedef struct {
78            char fn[MAXFN];
79            unsigned long index;
80            unsigned long offset;
81            unsigned long length;
82            char data[2];
83    } dsk_io;
84
85    #define DSKIOSIZ (sizeof(dsk_io)-2)
86
87    typedef struct {
88            dsk_io *msg;
89            stat   *reply;
90            unsigned long currmap;
91            int j;
92            int i;
93            unsigned long slotnum;
94            unsigned long mapnum;
95            unsigned long mapcount;
96            unsigned long dbpos;
97            struct mp_blk *map;
98    } store;
99
100   #define STORSIZ sizeof(store)
101
102   typedef struct {
103           char fn[MAXFN];
104           long pid;
105           char file_system[MAXFIL];
106           char file[MAXFIL];
107           char entry[MAXENT];
```

```
108  ) fil_io ;
109
110  #define FILIOSIZ sizeof(fil_io)
111
112  /*------------------------DATA TYES STRUCTURES ------------------------*/
```

| APPENDIX B Description of Program Listing | |
|---|---|
| Lines | Description |
| 26-29 | Include configuration and definition parameters. |
| 32-33 | Type the return of these local functions. |
| 36 | Main entry point. |
| 38-57 | Locally defined variables (for the main program). |
| 61-105 | Initialization. This code is executed once when the process is first activated. It is not executed thereafter. |
| 62 | Allocate a buffer to hold the disk volume table. |
| 63 | Call process 'FMcreator' with a message whose function is "init". The reply is received in msg. |
| 64 | Create an instance of process 'disk_mgt'. This will run as a child of this process ('file_mgt'). The pid (process identifier) of 'disk_mgt' is disk_pid. |
| 65 | Copy the name in the reply message to variable disk_name. |
| 66 | Send the reply message to process 'disk_mgt'. |
| 67 | Clear the volume table (voltbl) to binary zeros. |
| 68-69 | Initialize some variables. |
| 70-74 | Attempt to read the volume table from the currently mounted disk. |
| 75-78 | If the read was successful and the length of the reply is ok and the id field is "+cX file system+", then mark this file system as initialized. Otherwise mark it as uninitialized. |
| 85-86 | If not initialized, then use 'disk_name' as the current file system name. |
| 88-91 | Read the root node in the directory. Note. The directory on a cX file system is hierarchical; i.e., has the structure of a tree. |
| 94-105 | Close any files which are still open. Note. This initialization code is only executed when the system is booted, therefore if files are still open then the system must have crashed. |
| 111 | This is the main loop. The program loops "forever" receiving requests, processing requests and then recycling. |
| 112 | Wait until a request from a user is received. |
| 113-116 | If the supplied file pathname does not begin with '/', then reply immediately to the user with the message "Pathnames must be full". Jump then back to the head of the loop. |
| 117-124 | Search the file directory and find the directory node associated with the supplied pathname. Also parse the file_system name and return it. Also, if the function is to create a new file or directory then return that new name in 'file'. If the search was unsuccessful and the file system name was supplied, then return an error to the user with the message "File not found". If the search was unsuccessful and the file system name was not found then mark the message if necessary and forward the message to the next file system. |
| 125-126 | Convert the specified function to an integer value and switch on that value. Each of the successive "case" statements is one of those possible values. |
| 132-147 | Initialize the file system. If successful mark initialization as TRUE. Otherwise mark it FALSE. The work here is done in function 'vol_init', line 897-979. |
| 153-236 | Create a new data file. |
| 161-164 | Make sure the referenced directory in which the new data file will be created is indeed a directory (and not itself a data file). |
| 165-171 | If the name of the file to be created was supplied, then see if it already exists in this directory. If it does and is open then return the error "File exists and is currently open". If it does and isn't the file will be deleted before being recreated. |
| 171-184 | Allocate a new disk file. If successful, reply to the user or forward the request to the next file system based on whether in transparent mode. |
| 185-187 | If the file already existed, delete it. |
| 189-194 | If the file name was not supplied then create it for the user (as the concatenation of the index of the new file and the file system name). |
| 200-207 | Build the new directory node. |
| 208 | Write the new directory node. |
| 209-221 | The write was successful. Build the reply message to the user and send it. |
| 223-234 | The write was unsuccessful. Delete the allocated disk file and either error reply to the user or forward the request. |
| 242-287 | Rename an existing file. |
| 250 | Search for the file to be renamed. Note. Function 'findir' above has already found the directory in which this file should be found. |
| 251-255 | The file was found. If it is an open data file then error reply the user with "File is currently open". |
| 256 | Search for the directory in which the new name is to be installed. |
| 258-261 | If not found error reply with "Rename directory not found". |
| 262-265 | If it is not a directory error reply with "Not a directory". |
| 266-269 | If file rename not supplied then error reply with "Must specify rename file name". |
| 270 | Search for the file we are renaming to. |
| 271-274 | If it exists then error reply with "Rename file already exists". |
| 275-278 | Delete the old directory node and create and write the new directory node. |
| 280-285 | Rename directory could not be found. Either error reply or forward the request. |
| 292-311 | Delete a data file. |
| 300-303 | If the specified file is a directory error reply with "File is a directory". |
| 304-307 | If specified file is open error reply with "File is currently open". |
| 308 | Delete the file. |
| 317-361 | Open a data file. |
| 325-328 | If specified file is a directory error reply with "File is a directory". |
| 329-334 | If supplied access mode is not one of "exclusive", "readwrite" or "readonly" then error reply with "invalid mode". |
| 335-340 | If the file already open in exclusive mode, or the requested mode is "exclusive" and the file is open in some mode, or the file is open in readwrite mode and the requested mode is "readwrite" then error reply with "File is open; modes incompatible". |
| 341-342 | Set the requested access mode in the directory entry. |
| 343 | Increment the access count. |
| 344 | If the access mode is not "readonly" then save the pid of the user. |
| 345 | Rewrite the directory entry. |
| 346-358 | Build the reply to the user and send it. |

APPENDIX B
Description of Program Listing

| Lines | Description |
|---|---|
| 367-394 | Close a data file to access. |
| 375-378 | If the file is not open error reply with "File not open". |
| 379-380 | Adjust access mode as specified. |
| 381-383 | The ability to close a file based on the owner's pid is not supported yet. |
| 388-389 | Unmark owner pid and decrement access count. |
| 390 | Save the current time as the last access time to this file. |
| 391 | Rewrite the directory entry. |
| 392 | Reply to the user. |
| 399-462 | Query the file system. This function returns certain status information to the user. The available modes are "filesiz", "syssiz", "freesiz" and "volsiz". Each of these is requested of process 'disk_mgt'. The result is returned to the user. Mode "filesiz" returns the size of the referenced file in virtual disk blocks. Mode "syssiz" returns the total number of allocated virtual disk blocks. Mode "freesiz" returns the total number of available disk blocks. Mode "volsiz" returns the total number of virtual disk blocks comprising this file system. |
| 468-500 | Create a new directory. |
| 473 | Search for the specified new directory name. |
| 474-478 | If it already exists and is a data file then error reply with "Data file of same name exists". |
| 479-482 | If it exists and is directory and is not empty then error reply with "Directory exists and is not empty". |
| 483 | If it exists and is a directory and is empty generate a good reply to the user. (As if he has just created it.) |
| 486-498 | Build the new directory entry and write it. If the new directory name was not supplied then error reply with "Directory name must be specified". |
| 506-524 | Delete a directory. |
| 511-514 | If the referenced file is not a directory then error reply with "Not a directory". |
| 515-518 | If the directory is not empty then error reply with "Not an empty directory". |
| 519-523 | Delete the directory. |
| 530-561 | Return a list of the files contained within a subdirectory. |
| 535-538 | If the referenced file is not a directory error reply with "Not a directory". |
| 539-540 | Preallocate and initialize the reply message. |
| 542-557 | Copy the directory entry of each child file into the reply message. |
| 558 | Send the reply message back to the user. |
| 566-583 | Turn on or off the debug trace facility. This function is only used when the file system is being debugged. |
| 588-605 | Either the request message has wrapped around the logical ring or it references a different file system. Either reply to the user with an appropriate error message or forward the request to the next file system. |
| 611-617 | The specified function cannot be recognized. Reply to the user with "Unknown function". |
| 629-979 | These are attached functions (subroutines). |
| 629-659 | Check to see if the request message has wrapped around. Copy the 'mode' field in the message into a main program variable. Convert the supplied function (in ASCII) into an integer and return it as the function value. |
| 668-729 | Find the directory entry referenced by the supplied pathname and copy it into a main program variable. Parse out the referenced file system name and copy it into a main program variable. If the function is "new", "newdir", "initial" or "rename" then don't include the last file name in the pathname in the search. If anything here fails return FALSE; otherwise return TRUE. |
| 736-751 | Given the directory entry of a directory file, search its children for a file of the supplied name. If it exists copy the associated child directory into a main program variable and return TRUE. Otherwise return FALSE. |
| 759-810 | Delete the specified directory entry. If it is a non-empty directory return FALSE. If it is a data file delete the associated disk file. Dequeue the directory entry from the directory and return it to the free list. Return FALSE if anything fails and TRUE otherwise. |
| 818-854 | Given the parent directory entry install a child node for it. This fails only if there are no more directory entries on the free list. |
| 862-870 | Read the specified directory entry from the directory file. |
| 878-888 | Write the specified directory entry to the directory file. |
| 897-979 | Initialize the file system. This consists of the following. The disk is initialized, consisting of formatting it and writing certain tables and pointers, returning all virtual disk blocks to the free list. The volume table is built and written. The directory is built and written. The first entry is the root. The second entry is the directory file itself. The third and following entries are placed on a free list. |

What is claimed is:

1. A method of providing file system access in a data management system used in a data processing system comprising at least one processor, at least one memory storage unit coupled to said at least one processor, and a plurality of individual file systems and a requesting process contained in said at least one memory storage unit, said method comprising the steps of:

(a) generating an access request by said requesting process for a file having a given file name in one of said file systems having a given file system name, said access request specifying said file name and said file system name;

(b) transmitting said access request to one of said file systems;

(c) determining whether said file system has said specified file system name, and, if so, proceeding with step (e), but if not, automatically forwarding said access request to a different file system;

(d) repeating step (c) until either said file system with said specified file system name is located, in which case proceeding with step (e), or until said access request has been received by all of said file systems without locating said file system with said specified file system name and in such case generating an indication of an unsuccessful access to said file to said requesting process; and (e) determining whether said access request can be satisfied by said file system with said specified file system name, and, if so, satisfying said access request and generating an indication thereof directly to said requesting process, but if not, generating an indication of an unsuccessful access to said file to said requesting process.

2. The method of providing file system access recited in claim 1, wherein in steps (b) and (c) said access request is always forwarded to said file systems in a predetermined order.

3. A method of providing file system access in a data management system used in a data processing system comprising a plurality of processors interconnected by a network, a plurality of memory storage units, each processor being coupled to at least one memory storage unit, and a plurality of individual file systems and a requesting process contained in at least one memory storage unit, said method comprising the steps of:

(a) generating an access request by said requesting process for a file having a given file name in one of said file systems having a given file system name, said access request specifying said file name and said file system name;

(b) transmitting said access request to one of said file systems;

(c) determining whether said file system has said specified file system name, and, if so, proceeding with step (e), but if not, automatically forwarding said access request to a different file system;

(d) repeating step (c) until either said file system with said specified file system name is located, in which case proceeding with step (e), or until said access request has been received by all of said file systems without locating said file system with said specified file system name and in such case generating an indication of an unsuccessful access to said file to said requesting process; and (e) determining whether said access request can be satisfied by said file system with said specified file system name, and, if so, satisfying said access request and generating an indication thereof directly to said requesting process, but if not, generating an indication of an unsuccessful access to said file to said requesting process.

4. The method of providing file system access recited in claim 3, wherein in steps (b) and (c) said access request is forward to said file systems in a predetermined order.

5. A data management system for use in a data processing system comprising:

at least one processor for executing instructions;

at least one memory storage unit coupled to said at least one processor, said memory storage unit storing instructions and data;

a plurality of individual file systems contained in said at least one memory storage unit;

means responsive to the execution of an instruction by said at least one processor for generating an access request for a file having a given file name in at least one of said file systems having a specified file system name, said access request specifying said file name and said file system name;

means responsive to said access request generating means for transmitting said access request to one of said file systems;

first means responsive to the receipt of said access request for determining whether said one file system has said specified file system name, and, if so, generating a first control signal, but if not, generating a second control signal;

second means responsive to said first control signal for determining whether said access request can be satisfied by said file system having said specified file system name, and, if so, for satisfying said access request and generating a first indication of a successful access to said file directly to said at least one processor, and, if not, for generating a second indication of an unsuccessful access to said file;

third means responsive to said access request generating means, to said second control signal, and to said second indication for automatically forwarding said access request to successive, different file systems whereby:

(a) if said access request is forwarded to a file system having said specified file system name, said first control signal is generated by said first means, in which case said second means either generates said first indication or said second indication, depending upon whether said file is successfully or unsuccessfully accessed, respectively, and (b) if said access request is forwarded to a file system not having said specified file system name, said first means generates said second control signal, said third means ceasing to forward said access request after all of said file systems have been unsuccessful accessed and generating a third indication of an unsuccessfully access to said file directly to said at least one processor.

6. The data management system recited in claim 5, and further comprising means responsive to said access request generating means and to said access request forwarding means for forwarding said access request to said file systems in a predetermined pattern.

7. A data management system for use in a data processing system comprising:

a plurality of processors for executing instructions, said processors being interconnected by a network;

a plurality of memory storage units, each said processor being coupled to at least one of said memory storage units, said memory storage units storing instructions and data;

a plurality of individual file systems contained in at least one of said memory storage units;

means responsive to the execution of an instruction by one of said processors for generating an access request for a file having a given file name in at least one of said file systems having a specified file system name, said access request specifying said file name and said file system name;

means responsive to said access request generating means for transmitting said access request to one of said file systems;

first means responsive to the receipt of said access request for determining whether said one file system has said specified file system name, and, if so, generating a first control signal, but if not, generating a second control signal;

second means responsive to said first control signal for determining whether said access request can be satisfied by said file system having said specified file system name, and, if so, for satisfying said access request and generating a first indication of a successful access to said file directly to said one of said processors, and, if not, for generating a second indication of an unsuccessful access to said file;

third means responsive to said access request generating means, to said second control signal, and to said second indication for automatically forwarding said access request to successive, different file systems whereby:

(a) if said access request is forwarded to a file system having said specified file system name, said first control signal is generated by said first means, in which case said second means either generates said first indication or said second indication, depending upon whether said file is successfully or unsucessfully accessed, respectively, and (b) if said access request is forwarded to a file system not having said specified file system name, said first means generates said second control signal, said third means ceasing to forward said access request after all of said file systems have been unsuccessful accessed and generating a third indication of an unsuccessfully access to said file directly to said one of said processors.

8. The data management system recited in claim 7, and further comprising means responsive to said access request generating means and to said access request forwarding means for forwarding said access request to said file systems in a predetermined pattern.

* * * * *